United States Patent
Quiroga et al.

(10) Patent No.: US 7,555,475 B2
(45) Date of Patent: Jun. 30, 2009

(54) NATURAL LANGUAGE BASED SEARCH ENGINE FOR HANDLING PRONOUNS AND METHODS OF USE THEREFOR

(75) Inventors: Martin A. Quiroga, Kansas City, MO (US); Gordon H. Fischer, Kansas City, MO (US); John S. Flowers, Mission, KS (US)

(73) Assignee: Jiles, Inc., San Francisco, CA (US)

( * ) Notice: Subject to any disclaimer, the term of this patent is extended or adjusted under 35 U.S.C. 154(b) by 330 days.

(21) Appl. No.: 11/223,169

(22) Filed: Sep. 9, 2005

(65) Prior Publication Data

US 2006/0224570 A1     Oct. 5, 2006

Related U.S. Application Data

(63) Continuation-in-part of application No. 11/178,513, filed on Jul. 11, 2005, which is a continuation-in-part of application No. 11/117,186, filed on Apr. 28, 2005, now Pat. No. 7,447,683, which is a continuation-in-part of application No. 11/096,118, filed on Mar. 31, 2005.

(51) Int. Cl.
*G06F 17/30* (2006.01)

(52) U.S. Cl. .................... 707/3; 707/100; 715/200; 704/9

(58) Field of Classification Search ................ 707/100, 707/2–5; 715/200; 704/8, 9
See application file for complete search history.

(56) References Cited

U.S. PATENT DOCUMENTS

| | | | |
|---|---|---|---|
| 5,933,822 A | 8/1999 | Braden-Harder et al. | 707/5 |
| 5,963,940 A | 10/1999 | Liddy et al. | 707/5 |
| 5,966,686 A | 10/1999 | Heidorn et al. | |
| 6,125,342 A * | 9/2000 | Selesky | 704/9 |
| 6,202,064 B1 | 3/2001 | Julliard | 707/5 |
| 6,711,561 B1 | 3/2004 | Chang et al. | 707/3 |
| 6,745,181 B1 | 6/2004 | Chang et al. | 707/4 |
| 6,829,605 B2 | 12/2004 | Azzam | 707/5 |
| 7,058,564 B2 | 6/2006 | Ejerhed | 704/1 |
| 7,120,574 B2 | 10/2006 | Troyanova et al. | 704/9 |
| 7,194,455 B2 | 3/2007 | Zhou et al. | 707/3 |
| 7,209,876 B2 | 4/2007 | Miller et al. | 704/9 |
| 2002/0010574 A1 | 1/2002 | Tsourikov et al. | 704/9 |
| 2002/0198875 A1 | 12/2002 | Masters | 707/4 |
| 2003/0069877 A1 | 4/2003 | Grefenstette et al. | 707/2 |
| 2003/0200077 A1 * | 10/2003 | Leacock et al. | 704/1 |
| 2006/0123045 A1 | 6/2006 | Chang et al. | 707/102 |

OTHER PUBLICATIONS

Charles L.A. Clarke, Gordon V. Cormack, and Thomas R. Lynam, "Exploiting Redundancy in Question Answering" SIGIR '01, Sep. 19-12, 2001, New Orleans, LA, USA, p. 358-365.

(Continued)

*Primary Examiner*—Cheryl Lewis
(74) *Attorney, Agent, or Firm*—Polsinelli Shughart PC

(57) ABSTRACT

There is provided a sentence module that handles pronouns in sentences. Each pronoun is replaced by one or more nouns. These replaced nouns are used to form statements that populate the structured representation, in order to produce precise answers to queries, as part of a search engine application.

35 Claims, 30 Drawing Sheets

OTHER PUBLICATIONS

Wei Li, Rohini K. Srihari, Xiaoge Li, M. Srikanth, Xiuhong Zhang, Cheng Niu, "Extracting Exact Answers to Questions Based on Structural Links", International Conference on Computational Linguistics, proceeding of the 2002 conference on multilingual summarization and question answering, vol. 19, pp. 1-9, 2002.

Julian Kupiec, "MURAX: A Robust Linguistic Approach for Question Answering Using an On-Line Encyclopedia", ACM-SIGIR'93, Pittsburgh PA, USA, 1993, pp. 181-190.

Cody Kwok, Oren Etzioni and Daniel S. Weld, "Scaling Question Answering to the Web", ACM Transactions on Information Systems, vol. 19, No. 3, Jul. 2001, pp. 242-262.

Boris Katz and Jimmy Lin, "Annotating the Semantic Web Using Natural Language", In Proceedings of the 2nd Workshop on NLP and XML (NLPXML 2002) at COLING 2002, Sep. 2002, Taipei, Taiwan.

Boris Katz et al "Integrating Web-Based and Corpus-based Techniques for Question Answering" In proceedings of the Twelfth Text Retrieval Conference (TREC 2003), Nov. 2003, Gaithersburg, Maryland.

Rohini K. Srihari, et al. "InfoXtract: A Customiziable Intermediate Level Information Extraction Engine", HLT-NAACL, 2003 Workshop: Software Engineering and Architecture of Language Technology System, pp. 51-58, Edmonton, May-Jun. 2003.

Boris Katz and Jimmy Lin "Rexton: A System for Generating Relations From Natural Language", In Proceedings of the ACL 2000 Workshop and Natural Language Processing and Information Retrieval (NLP&IR) Oct. 2000, Hong Kong, China.

Strzalkowski, Tomek et al., Natural Language Information Retrieval in Digital Libraries, 1996, ACM, pp. 117-125.

McDaniel et al., Content Based File Type Detection Algorithms, Proceedings of the 36th Hawaii International Conference on System Sciences (HICSS '03), 10 pages.

Office Action for U.S. Appl. No. 11/178,513, Natural Language Based Search and Methods of Use Therefor, dated Mar. 4, 2009, 26 pages.

* cited by examiner

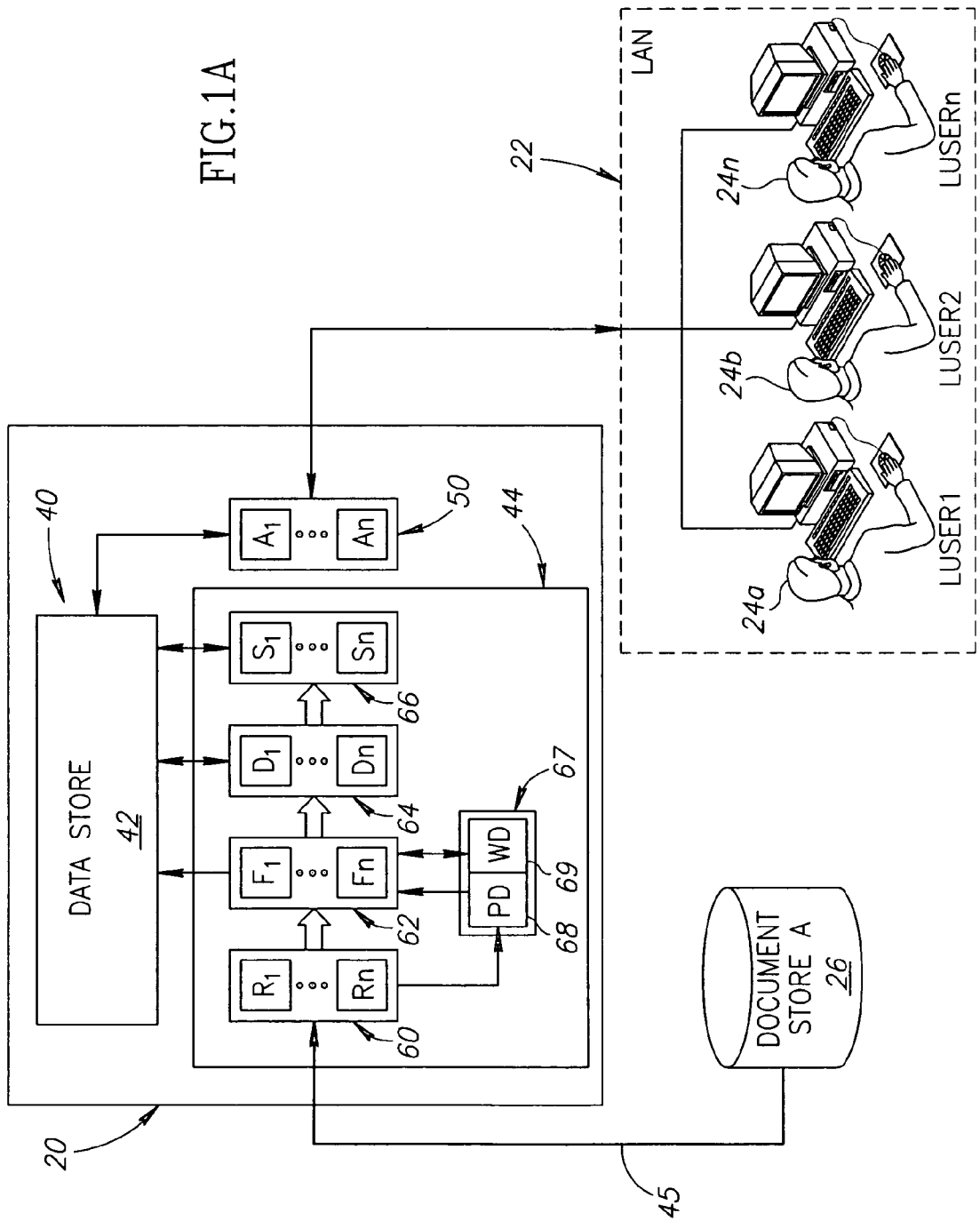

| concept_name | start_concept | end_concept |
| --- | --- | --- |
| a | VALID | INVALID |
| about | VALID | INVALID |
| an | VALID | INVALID |
| and | INVALID | INVALID |
| are | VALID | VALID |
| as | INVALID | INVALID |
| at | VALID | INVALID |
| be | VALID | INVALID |
| but | INVALID | INVALID |
| by | VALID | INVALID |
| do | INVALID | INVALID |
| for | VALID | VALID |
| from | VALID | VALID |
| have | VALID | VALID |
| how | VALID | INVALID |
| i | VALID | INVALID |
| if | INVALID | INVALID |
| in | INVALID | INVALID |
| is | VALID | VALID |
| it | VALID | INVALID |
| not | VALID | VALID |
| of | INVALID | VALID |
| on | INVALID | VALID |
| or | INVALID | INVALID |
| out | VALID | VALID |
| so | INVALID | INVALID |
| that | INVALID | INVALID |
| the | VALID | INVALID |
| this | VALID | INVALID |
| to | INVALID | INVALID |
| was | VALID | VALID |
| we | VALID | INVALID |
| what | VALID | INVALID |
| when | INVALID | INVALID |
| where | INVALID | INVALID |
| which | INVALID | INVALID |
| with | VALID | INVALID |
| you | VALID | INVALID |
| , | INVALID | INVALID |
| : | INVALID | INVALID |
| ; | INVALID | INVALID |
| ! | INVALID | INVALID |
| ? | INVALID | INVALID |
| @ | INVALID | INVALID |
| * | INVALID | INVALID |

FIG.8

| | | |
|---|---|---|
| what | is.v | Ss*w |
| is.v | level.n | Ost |
| the | level.n | Ds |
| current.n | level.n | AN |
| security.n | level.n | AN |

| | | | |
|---|---|---|---|
| what.nil | is.v | Ss*w | CLID8 |
| is.v | level.n | Ost | CLID9 |
| the.nil | level.n | Ds | CLID1 |
| current.n | level.n | AN | CLID2 |
| security.n | level.n | AN | CLID3 |

| who | is.v | Ss*w |
|---|---|---|
| is.v | president.n | Ost |
| the | president.n | Ds |
| U.S. | president.n | AN |

| who | is.v | Ss*w |
|---|---|---|
| is.v | president.n | Ost |
| the | president.n | Ds |
| U.S. | president.n | AN |

| who.nil | is.v | Ss*w |
|---|---|---|
| is.v | president.n | Ost |
| the.nil | president.n | Ds |
| U.S..nil | president.n | AN |
| president.n | is.v | |

| who.nil | is.v | Ss*w | CLID1 | 3 |
|---|---|---|---|---|
| is.v | president.n | Ost | CLID2 | 7 |
| the.nil | president.n | Ds | CLID3 | 8 |
| U.S..nil | president.n | AN | CLID4 | 9 |
| president.n | is.v | Ss | CLID5 | 8 |

NATURAL LANGUAGE BASED SEARCH ENGINE FOR HANDLING PRONOUNS AND METHODS OF USE THEREFOR

CROSS-REFERENCE TO RELATED APPLICATIONS

This application is a continuation in part application of commonly owned U.S. patent application Ser. No. 11/178,513, entitled: NATURAL LANGUAGE BASED SEARCH ENGINE AND METHODS OF USE THEREFOR, filed Jul. 11, 2005, which is a continuation in part application of commonly owned U.S. patent application Ser. No. 11/117,186, now U.S. Pat. No. 7,447,683 entitled: NATURAL LANGUAGE BASED SEARCH ENGINE AND METHODS OF USE THEREFOR, filed Apr. 28, 2005, which is a continuation in part application of commonly owned U.S. patent application Ser. No. 11/096,118, entitled: NATURAL LANGUAGE BASED SEARCH ENGINE AND METHODS OF USE THEREFOR, filed Mar. 31, 2005, all three of these U.S. patent applications are incorporated by reference herein.

TECHNICAL FIELD

The present invention is directed to systems and methods for analyzing queries, placed into a system in natural language, and typically generating at least one result for the natural language query. The result is typically an answer, in the form of a sentence or a phrase, and the document from which it is taken, including a hypertext link for the document.

BACKGROUND

As technology progresses, considerable amounts of information are becoming digitized, so as to be accessible through databases, servers and other storage media, along networks, including the Internet. When a user seeks certain information, it is essential to provide the most relevant information in the shortest time. As a result, search engines have been developed, to provide users with such relevant information.

Search engines are programs that search documents for specified keywords, and return a list of the documents where the keywords were found. The search engines may find these documents on public networks, such as the World Wide Web (WWW), newsgroups, and the like.

Contemporary search engines operate by indexing keywords in documents. These documents include, for example, web pages, and other electronic documents. Keywords are words or groups of words, that are used to identify data or data objects. Users typically enter words, phrases or the like, typically with Boolean connectors, as queries, on an interface, such as a Graphical User Interface (GUI), associated with a particular search engine. The search engine isolates certain words in the queries, and searches for occurrences of those keywords in its indexed set of documents. The search engine then returns one or more listings to the GUI. These listings typically include a hypertext link to a targeted web site, that if clicked by the user, will direct the browser associated with the user to the targeted web site.

Other contemporary search engines have moved away from keyword searching, by allowing a user to enter a query in natural language. Natural language, as used here and throughout this document (as indicated below), includes groups of words that humans use in their ordinary and customary course of communication, such as in normal everyday communication (general purpose communication) with other humans, and, for example, may involve writing groups of words in an order as though the writer was addressing another person (human). These systems that use natural language are either template based systems or knowledge based systems. These systems can operate together or independently of each other.

Template based systems employ a variety of question templates, each of which is responsible for handling a particular type of query. For example, templates may be instruction templates (How do I "QQ"?), price templates (How much does "RR" cost), direction templates (Where is "SS" located?), historical templates (When did "TT" occur), contemporary templates (What is the population of "UU"?, Who is the leader of "VV"?), and other templates, such as (What is the market cap of "WW"?, What is the stock price of "XX"?). These templates take the natural language entered and couple it with keywords, here for example, "QQ"-"XX" and may further add keywords, in order to produce a refined search for providing a response to the query.

Knowledge based systems are similar to template based systems, and utilize knowledge that has been previously captured to improve on searches that would utilize keywords in the query. For example, a search using the keyword "cats" might be expanded by adding the word "feline" from the knowledge base that cats are felines. In another example, the keyword "veterinarians" and the phrase "animal doctor" may be synomonous in accordance with the knowledge base.

However, both the template and knowledge based systems, although using some natural language, continue to conduct keyword based searches. This is because they continue to extract keywords from the natural language queries entered, and search based on these keywords. While the searches conducted are more refined than pure keyword based search engines, these systems do not utilize the natural language as it is written, and in summary, perform merely refined keyword searches. The results of such searches are inaccurate and have little if any chance of returning a precise answer for the query.

SUMMARY

This document references terms that are used consistently or interchangeably herein. These terms, including variations thereof, are as follows.

"Natural language", as stated above, includes groups of words that humans use in their ordinary and customary course of communication, such as in normal everyday communication (general purpose communication) with other humans, and, for example, may involve writing groups of words in an order as though the writer was addressing another person (human).

"Query" includes a request for information, for example, in the form of one or more, sentences, phrases, questions, and combinations thereof.

"Pull", "pulls", "pulled", "pulling", and variations thereof, include the request for data from another program, computer, server, or other computer-type device, to be brought to the requesting module, component, device, etc., or the module, component, device, etc., designated by the requesting device, module, etc.

"Documents" are any structured digitized information, including textual material or text, and existing as a single sentence or portion thereof, for example, a phrase, on a single page, to multiple sentences or portions thereof, on one or more pages, that may also include images, graphs, or other non-textual material.

"Sentences" include formal sentences having subject and verbs, as well as fragments, phrases and combinations of one or more words.

"Word" includes a known dictionary defined word, a slang word, words in contemporary usage, portions of words, such as "'s" for plurals, groups of letters, marks, such as "?", ";", symbols, such as "@", and characters.

For purposes of explanation, concepts are used interchangeably with concept identifiers (CIDs), and concept links are used interchangeably with concept link identifiers (CLIDs).

"Modules", are typically self contained components, that facilitate hardware, software, or combinations of both, for performing various processes, as detailed herein.

"Push", "pushed", "pushing" or variations thereof, include data sent from one module, component, device, etc, to another module, component, device, etc., without a request being made from any of the modules, components, devices, etc., associated with the transfer of the data.

"Statement", is a set of concept links (concept link identifiers) that corresponds to a parse of a particular sentence (from its natural language).

A "query statement" is a set of concept links (concept link identifiers) that correspond to the parse of the query.

A "master set" is all of the valid concept link identifiers (CLIDs) from a query statement.

A "power set" is written as the function P(S), and is representative of the set of all subsets of "S", where "S" is the master set.

"Degree" or "degrees" is the number of concept links in a set.

A "blog" is short for "Web Log", and is a publicly accessible personal journal, typically of an individual.

The present invention improves on the contemporary art, as it provides a search engine and associated functionalities, that operate on natural language queries, and utilize the syntactic relationships between the natural language elements of the query, to typically return at least one result to the user.

The system of the invention is also a cumulative system, that continuously builds its data store, from which query answers are obtained. As time progresses, the data store becomes increasingly larger, increasing the chances for a more precise answer to queries entered by users.

The system of the invention is suitable for private networks, such as with enterprises, as well as public networks, such as wide area networks, for example, the Internet. The invention is also operable with combinations of private and public networks.

An embodiment of the invention is directed to a method for analyzing a query. The method includes, receiving a query in natural language, and, providing at least one response to the query in accordance with the relationships of the words to each other in natural language, of the query.

Another embodiment of the invention is directed to a search engine. The search engine has a first component that receives a query in natural language. It also has a second component that provides at least one response to the query in accordance with the relationships of the words to each other in natural language, of the query.

An embodiment of the invention is directed to a method for isolating data from a corpus. The method includes processing at least a portion of the corpus into a first collection of syntactic relationships, processing at least one query into a second collection of syntactic relationships, and, comparing the second collection of syntactic relationships to the first collection of syntactic relationships. If a match of syntactic relationships between the collections is found, the matching collection of syntactic relationships in the first collection is isolated. The data, for example, sentences, documents, and the like, typically in natural language, are returned to the party (typically, the computer or computer-type device associated with the party) who requested the data isolated from the corpus.

Another embodiment of the invention is directed to a method for providing at least one response to at least one query in natural language. The method includes populating a data store by obtaining documents from at least a portion of a corpus, isolating sentences from the documents, parsing the sentences into linked pairs of words in accordance with predetermined relationships, assigning concept identifiers to each word of the linked pair of words, assigning concept link identifiers to each pair of concept identifiers corresponding to each linked pair of words, and, combining the concept link identifiers for each sentence into a statement. An inputted query in natural language is received. The inputted query is parsed into linked pairs of words in accordance with predetermined relationships, concept identifiers are assigned to each word of the linked pair of words, concept link identifiers are assigned to each pair of concept identifiers corresponding to each linked pair of words, and, the concept link identifiers are combined into a query statement. The query statement and the statements in the data store are analyzed for matches between concept link identifiers. If there are matches, the matching statements in the data store are isolated. At least one sentence corresponding to at least one isolated statement in the data store is typically provided to a predetermined location as a response to the natural language query.

Another embodiment of the invention is directed to a method for analyzing a query to a search engine. The method includes creating related pairs of words in the query, and assigning concept identifiers to each of the words in each of the related pairs of words. Pairs of concept identifiers are then created by applying the assigned concept identifiers to each word in the related pairs of words. Concept link identifiers are assigned to each pair of concept identifiers, and all of the concept link identifiers are combined into a query statement.

All of the concept link identifiers of the query statement define a master set, where N is the number of concept link identifiers in the master set. A power set is created from the master set. Creation of the power set involves creating a plurality of subsets from the master set, where the plurality of subsets define members of the power set, and the power set includes at least one member of N concept link identifiers, and at least N members of one concept link identifier.

The members of the power set are analyzed against statements from a data store, in a structured representation. The statements from the data store, having the greatest number of concept link identifiers, that match all of the concept link identifiers of the highest degreed member (member set) of the power set, is the highest ranked statement(s). The highest ranked statement(s) is/are typically returned as results or answers, to the query made to the search engine of the invention.

Another embodiment of the invention is directed to a method for analyzing a query to a search engine, made in natural language. The method includes creating related pairs of words from the natural language of the query, and assigning concept identifiers to each of the words in each of the related pairs of words. Pairs of concept identifiers are then created, by applying the assigned concept identifiers to each word in the related pairs of words. Concept link identifiers are assigned to each pair of concept identifiers, and all of the concept link identifiers are combined into a query statement.

All of the concept link identifiers of the query statement define a master set, where N is the number of concept link identifiers in the master set. A power set is created from the master set. Creation of the power set involves creating a plurality of subsets from the master set, where the plurality of subsets define members of the power set, and the power set includes at least one member of N concept link identifiers, and at least N members of one concept link identifier.

The members of the power set are analyzed against statements from a data store, in a structured representation. The statements from the data store, having the greatest number of concept link identifiers, that match all of the concept link identifiers of the highest degreed member (member set) of the power set, is the highest ranked statement(s). The highest ranked statement(s) is/are typically returned as results or answers in natural language, to the query made to the search engine of the invention.

Another embodiment of the invention is directed to a method for identifying a document from syntactic relationships. The method includes electronically maintaining a document database, identifying documents, electronically maintaining a sentences database, identifying sentences of each of the documents, and, electronically maintaining a syntactic relationships database, identifying collections of syntactic relationships between pairs of words formed from the words of each of the sentences. Each of the databases is electronically linked, such that when at least one collection of syntactic relationships is isolated, the corresponding sentence in the sentence database is isolated, and the corresponding document in the document database is isolated from the isolated sentence in the sentence database. The collections of syntactic relationships define statements, that include concept link identifiers. The concept link identifiers are formed from pairs of concept identifiers. Each word of each pair of words has an assigned concept identifier.

Another embodiment of the invention is directed to an architecture for isolating data from a corpus. The architecture includes, at least one data storage unit including at least one database, a database population module coupled to the at least one data storage unit, and, an answer module coupled to the at least one data storage unit. The database population module is configured for processing at least a portion of the corpus into at least one first collection of syntactic relationships, and, storing the at least one first collection of syntactic relationships in the at least one data storage unit. The answer module is configured for, processing at least one query into at least one second collection of syntactic relationships, and, comparing the at least one second collection of syntactic relationships to the at least one first collection of syntactic relationships.

Another embodiment of the invention is directed to improve the accuracy of answers returned for a question, e.g., a query, inputted into the system of the invention. In this embodiment, the system is programmed to augment data from the query with additional data, for example, one or more concept link identifiers, that are in addition to concept link identifiers, derived from a standard output, resulting from the query being parsed by a parser. This additional data, based on the inputted query, potentially results in a more defined set and more accurate listing of one or more responses from the system, to the inputted query.

For example, in English language grammar, questions, typically the form in which queries are inputted into the system, are such that the main noun and verb are reversed, when compared to the order of the main noun and verb in the corresponding sentence, answering the question. This is seen by looking at the order of the verb "is" and noun "president" in the query, "Who is president?", and the response, "The president is Bush." In the query and the response, the order of the main verb and noun "is president" is switched. Accordingly, by adding data corresponding to the word pair "president is", the switched or reordered word pair, the augmented data corresponding to the inputted query, may potentially yield a more accurate response.

An embodiment of the invention is directed to a method for providing at least one response to at least one query in natural language. The method includes, populating a data store by obtaining documents from at least a portion of a corpus, isolating sentences from the documents, parsing the sentences into linked pairs of words in accordance with predetermined relationships, assigning concept identifiers to each word of the linked pair of words, assigning concept link identifiers to each pair of concept identifiers corresponding to each linked pair of words, and, combining the concept link identifiers for each sentence into a statement.

The method also includes, receiving an inputted query in natural language, parsing the query into linked pairs of words, one word of the pair of words at a first position, and another word of the pair of words at a second position, each linked pair of words associated with a relational connector, determining if the relational connector associated with each linked pair of words matches a predetermined relational connector, and, if there is a match, creating an additional pair of words whose positions are opposite those of the pair of words whose relational connector matched the predetermined relational connector. Concept identifiers are assigned to each word of each linked pair of words, and, concept link identifiers are assigned to each pair of concept identifiers corresponding to each linked pair of words. The concept link identifiers are combined into a query statement, and the query statement, and the statements in the data store, are analyzed for matches between concept link identifiers. Statements in the data store having at least one concept link identifier that matches at least one concept link identifier in the query statement are isolated and, at least one sentence corresponding to at least one isolated statement in the data store, is provided as a response to the natural language query.

Another embodiment of the invention is directed to a method for analyzing a query to a search engine. The method includes, creating related pairs of words in the query, each of the related pairs of words including a relational connector, each of the related pairs of words including one word at a first position and one word at a second position. The method also includes, identifying related pairs of words that include a relational connector that matches a relational connector from a collection of at least one predetermined relational connector, and, creating additional related pairs of words from the identified pairs of words, including, changing the positions of the words from the identified pairs of words. Concept identifiers are assigned to the each of the words in each of the related pairs of words, and pairs of concept identifiers are created by applying the assigned concept identifiers to each word in the related pairs of words. Concept link identifiers are assigned to each pair of concept identifiers, and, all of the concept link identifiers are combined into a query statement.

Another embodiment of the invention is directed to a method for analyzing a query to a search engine. The method includes, creating related pairs of words from the language, for example, natural language, of the query, each of the related pairs of words including a relational connector, each of the related pairs of words including one word at a first position and one word at a second position, and, identifying related pairs of words having a relational connector that matches a relational connector from a collection of at least one predetermined relational connector. Additional related pairs of words are created from the identified pairs of words, by changing the positions of the words from the identified pairs of words. Concept identifiers are assigned to the each of the words in each of the related pairs of words, and, concept link identifiers are assigned to each pair of concept identifiers. All of the concept link identifiers are combined into a query statement.

Another embodiment of the invention is directed to a method for creating additional concept links from a set of concept pairs derived from a received query, for providing at least one response to the query. The method includes, reordering the positions of words in word pairs corresponding to concept pairs, that have a predetermined relational connector, to form new concept pairs, and, adding the new concept pairs to the set of concept pairs. The reordering typically includes switching or flipping the positions of the words in the respective word pair.

Another embodiment of the invention is directed to a system for providing at least one response to a received query. The system includes, at least one storage media for storing concept identifiers and concept link identifiers extracted from a corpus, a processor, electronically coupled to the at least one storage media. The processor is programmed to: create related pairs of words from the query, each of the related pairs of words including a relational connector, each of the related pairs of words including one word at a first position and one word at a second position; identify related pairs of words that include a relational connector that matches a relational connector from a collection of at least one predetermined relational connector; create additional related pairs of words from the identified pairs of words by changing the positions of the words from the identified pairs of words; assign concept identifiers to the each of the words in each of the related pairs of words; create pairs of concept identifiers by applying the assigned concept identifiers to each word in the related pairs of words; assign concept link identifiers to each pair of concept identifiers; and, combine all of the concept link identifiers into a query statement.

Another embodiment of the invention is directed to methods, systems, and architectures for handling pronouns in sentences. These methods and modules function to replace each pronoun with one or more equivalent nouns. These replaced nouns are used to form statements that populate the structured representation, in order to produce answers to queries, for example, as part of a search engine application.

Another embodiment of the invention is directed to a method for replacing pronouns in word groups derived from predetermined collections of words. The method includes, isolating the pronoun in each word group, and, determining at least one noun to replace each of the isolated pronouns. The at least one replacement noun is determined by evaluating each of the nouns with respect to their proximity to the corresponding pronoun that has been isolated, in the predetermined collection of words.

Another embodiment of the invention is directed to a method for creating statements for providing at least one response to at least one query. The method includes, creating a list of words (i.e., an array) having at least one pronoun, parsing a series of words arranged in a predetermined order into a parsed output, the parsed output including a first collection of words, comparing the pronoun array with pronouns from the parsed output to identify pronouns, and, replacing each identified pronoun in the first collection of words with a noun corresponding to the matched pronoun to form a second collection of words.

Another embodiment of the invention is directed to a method for producing statements from paired words. The method includes, obtaining related groups of words from a first parse of a predetermined collection of words, isolating the nouns and pronouns from the first parse into a second parse, comparing predetermined pronouns against the nouns and pronouns of the second parse for pronoun matches, determining a noun for each matched pronoun and, replacing each matched pronoun with the determined noun in the corresponding related group of words.

Another embodiment of the invention is directed to a module for handling pronouns. The module is typically in a search engine architecture. The module includes at least one storage media for storing a list of predetermined pronouns, and a processor, such as a microprocessor or the like. The processor is programmed to: obtain related groups of words from a first parse of a predetermined series of words, isolate the nouns and pronouns from the first parse into a second parse, compare predetermined pronouns from the at least one storage media against the nouns and pronouns of the second parse for pronoun matches, determine at least one noun for each matched pronoun, and, replace each matched pronoun with the at least one noun in the corresponding related group of words.

Another embodiment of the invention is directed to a method for providing at least one response to at least one query in natural language. The method includes, populating a data store by obtaining documents from at least a portion of a corpus, isolating sentences from the documents, parsing the sentences into linked pairs of words in accordance with predetermined relationships, and, identifying pronouns in each of the linked pairs of words. Each of the identified pronouns is replaced with a corresponding proper noun, and concept identifiers are assigned to each word of the linked pair of words. Concept link identifiers are assigned to each pair of concept identifiers corresponding to each linked pair of words, and, the concept link identifiers for each sentence are combined into a statement.

An inputted query in natural language is received, and the query is parsed into linked pairs of words. Concept identifiers are assigned to each word of each linked pair of words, and concept link identifiers are assigned to each pair of concept identifiers corresponding to each linked pair of words. The concept link identifiers are then combined into a query statement. The query statement is then analyzed for matches with statements in the data store for matches between the respective concept link identifiers.

Another embodiment of the invention is directed to a method for creating concept links from a set of concept groups derived from data from a corpus. The method includes, analyzing the words in word groups corresponding to each of the concept groups, for words that are pronouns, and, replacing each of the pronouns in each of the word groups with nouns corresponding to each of the pronouns.

Another embodiment of the invention is directed to a system for providing at least one response to a received query. The system includes, at least one storage media for storing concept identifiers, concept link identifiers, pronouns, and at least one noun corresponding to each of the pronouns, extracted from a corpus, and statements derived from the corpus, and a processor in communication with the at least one storage media. The processor is programmed to: create related pairs of words from the predetermined series of words from documents of the corpus, each of the related pairs of words including one word at a first position and one word at a second position, identify pronouns by matching pronouns in each of the related pairs of words with pronouns in the at least one storage media, replace each of the identified pronouns with a corresponding noun, assign concept identifiers to each word in each pair of words, create pairs of concept identifiers by applying the assigned concept identifiers to each word in the related pairs of words, assign concept link identifiers to each pair of concept identifiers, combine all of the concept link identifiers into a statement, and, store the statement in the at least one storage media.

Another embodiment of the invention is directed to a method for conducting a natural language search. The method includes, substituting at least one noun for any pronoun in first data obtained from documents, receiving at least one query in natural language, and creating second data from the at least one query, and, comparing the first data with the second data to provide at least one response to the at least one query.

Another embodiment of the invention is directed to a method for conducting a natural language search. The method includes detecting pronouns in word groups, that are obtained from a corpus of data, and, replacing the pronouns in the word groups with nouns from the corpus of data to form substituted statements. Word groups are also created from an inputted query, and, word groups from the substituted statements that match at least one word group from the query are isolated. At least one response is then provided to the inputted query based on the matching word groups.

BRIEF DESCRIPTION OF THE DRAWINGS

Attention is now directed to the drawing figures, where corresponding or like numerals and/or characters, indicate corresponding or like components. In the drawings:

FIG. 1A is a schematic diagram of the system of an embodiment of the invention in an exemplary operation in an enterprise or private network, such as a local area network (LAN);

FIG. 8 is a table of stop words;

Appendices A-D are also attached to this document.

DETAILED DESCRIPTION

The invention is directed to systems and methods for performing search engine functions and applications. In particular, the invention is directed to search engines that perform searches based on the natural language and its associated syntax of the query, that has been entered into the system, and for which a search result will be produced. Throughout this document (as indicated above), "query" includes a request for information, for example, in the form of one or more, sentences, phrases, questions, and combinations thereof.

Figure 1B:
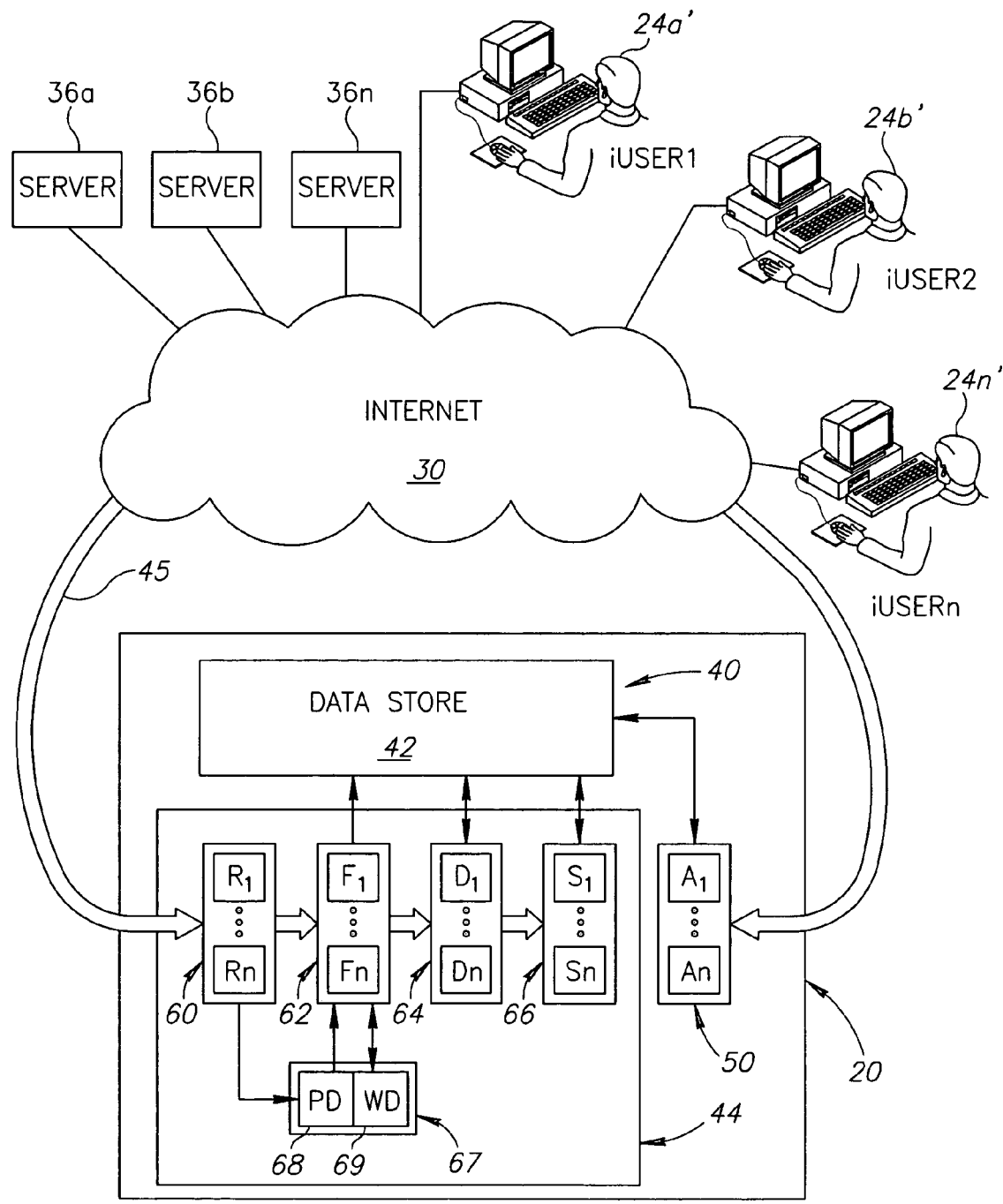
FIG. 1B is a schematic diagram of the system of an embodiment of the invention in an exemplary operation in a public network, such as the Internet.

FIGS. 1A and 1B detail the system of the invention, in an exemplary configuration as a server 20 or other hosting system of one or more components, in exemplary operations. The server 20 is common to the systems of FIG. 1A and FIG. 1B, except where specifically modified to accommodate the private or local area network (LAN) of FIG. 1A, and the public or wide area network (WAN) of FIG. 1B. Alternately, the server 20 can be modified to work with networks that are partially private and partially public.

FIG. 1A shows the server 20 operating in a closed system (private network), such as a local area network (LAN) 22, being accessed by users 24a, 24b, 24n (LUSER1-LUSERn). The server 20 receives data from document storage media, for example, the document store 26. This setting is typical of an enterprise setting.

FIG. 1B shows the server 20 operating in a publicly accessible network, for example, with a wide area network (WAN), such as the Internet 30. The server is accessed by one or more users 24a', 24b', 24n' (iUSER1-iUSERn), and the server 20 is linked to the Internet 30 to obtain feeds from sources linked to the Internet 30, for example, such as target Hypertext Transfer Protocol (HTTP) or File Transfer Protocol (FTP) servers 36a-36n. As used in this document "link(s)", "linked" and variations thereof, refer to direct or indirect electronic connections that are wired, wireless, or combinations thereof.

The server 20 is the same in FIGS. 1A and 1B, except for the links to the sources and network connections. The server 20 is formed of an exemplary architecture 40 for facilitating embodiments of the invention. The architecture 40 is typically on a single server, but is also suitable to be on multiple servers and other related apparatus, with components of the architecture also suitable for combination with additional devices and the like.

The server 20 is typically a remote computer system that is accessible over a communications network, such as the Internet, a local area network (LAN), or the like. The server serves as an information provider for the communications network.

Figure 2:
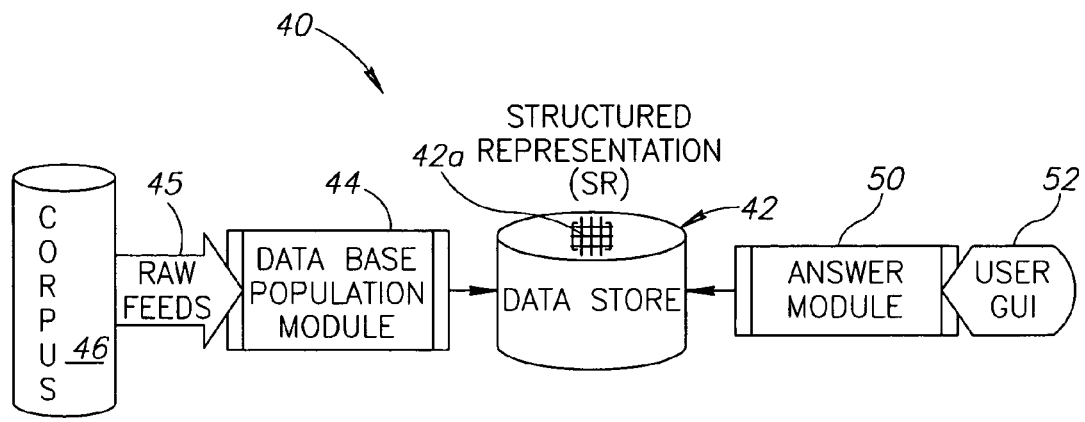
FIG. 2 is a schematic diagram of the architecture for the system of FIGS. 1A and 1B.

Turning also to FIG. 2, the architecture 40 may be, for example, an application, such as a search engine functionality. The architecture 40 includes a data store 42, that typically includes one or more databases or similar data storage units. A database population module 44 populates (provides) the data store 42 with content, by pulling data from raw feeds 45 (FIG. 2), and processing the pulled data. The database population module 44 receives raw feeds 45, by pulling them from a corpus 46 or a portion of the corpus 46.

Throughout this document (as indicated above), the terms "pull", "pulls", "pulled", "pulling", and variations thereof, include the request for data from another program, computer, server, or other computer-type device, to be brought to the requesting module, component, device, etc., or the module, component, device, etc., designated by the requesting device, module, etc.

The corpus 46 is a finite set of data at any given time. For example, the corpus 46, may be text in its format, and its content may be all of the documents of an enterprise in electronic form, a set of digitally encoded content, data from one or more servers, accessible over networks, such as the Internet, etc. Raw feeds 45 may include, for example, news articles, web pages, blogs, and other digitized and electronic data, typically in the form of documents.

Throughout this document (as indicated above), "documents" are any structured digitized information, including textual material or text, existing as a single sentence or portion thereof, for example, a phrase, on a single page, to multiple sentences or portions thereof, on one or more pages, that may also include images, graphs, or other non-textual material. "Sentences" include formal sentences having subject and verbs, as well as fragments, phrases and combinations of one or more words. Also, a "word" includes a known dictionary defined word, a slang word, words in contemporary usage, portions of words, such as "'s" for plurals, groups of letters, marks, such as "?", ",", symbols, such as "@", and characters.

The pulled data is processed by the database population module 44, to create a structured representation (SR) 42$a$, that is implemented by the data store 42. The structured representation (SR) 42$a$ includes normalized documents (an internally processed document into a format usable by the document module (D) 64, as detailed below), the constituent sentences from each normalized document, and collections of syntactic relationships derived from these sentences. Syntactic relationships include, for example, syntactic relationships between words. The words originate in documents, that are broken into constituent sentences, and further broken into data elements including concepts, concept links (groups of concepts, typically ordered pairs of concepts), and statements (groups of concept links).

As detailed below, concepts and concept links will be assigned identifiers. In particular, each concept is assigned a concept identifier (CID), and each concept link, formed by linked pairs of concept identifiers (CIDs), in accordance with the relational connectors of the Link Grammar Parser (LGP), as detailed below, is assigned a concept link identifier (CLID). Accordingly (as indicated above), for purposes of explanation, concepts are used interchangeably with concept identifiers (CIDs), and concept links are used interchangeably with concept link identifiers (CLIDs).

An answer module (A) 50 is also linked to a graphical user interface (GUI) 52 to receive input from a user. The answer module (A) 50 is also linked to the structured representation (SR) 42$a$, as supported by the data store 42.

Turning back to FIGS. 1A and 1B, the database population module 44 includes retrieval modules ($R_1$-$R_n$) 60, feed modules ($F_1$-$F_n$) 62, that are linked to document modules ($D_1$-$D_n$) 64, that are linked to sentence modules ($S_1$-$S_n$) 66. The retrieval modules ($R_1$-$R_n$) 60 are linked to storage media 67, that is also linked to the feed modules ($F_1$-$F_n$) 62. The feed modules ($F_1$-$F_n$) 62, document modules ($D_1$-$D_n$) 64 and sentence modules ($S_1$-$S_n$) 66 are linked to the data store 42. "Modules", as used throughout this document (as indicated above), are typically self contained components, that facilitate hardware, software, or combinations of both, for performing various processes, as detailed herein.

The storage media 67 may be any known storage for data, digital media and the like, and may include Redundant Array of Independent Disks (RAIDs), local hard disc(s), and sources for storing magnetic, electrical, optical signals and the like. The storage media 67 is typically divided into a processing directory (PD) 68 and a working directory (WD) 69.

Figure 3:
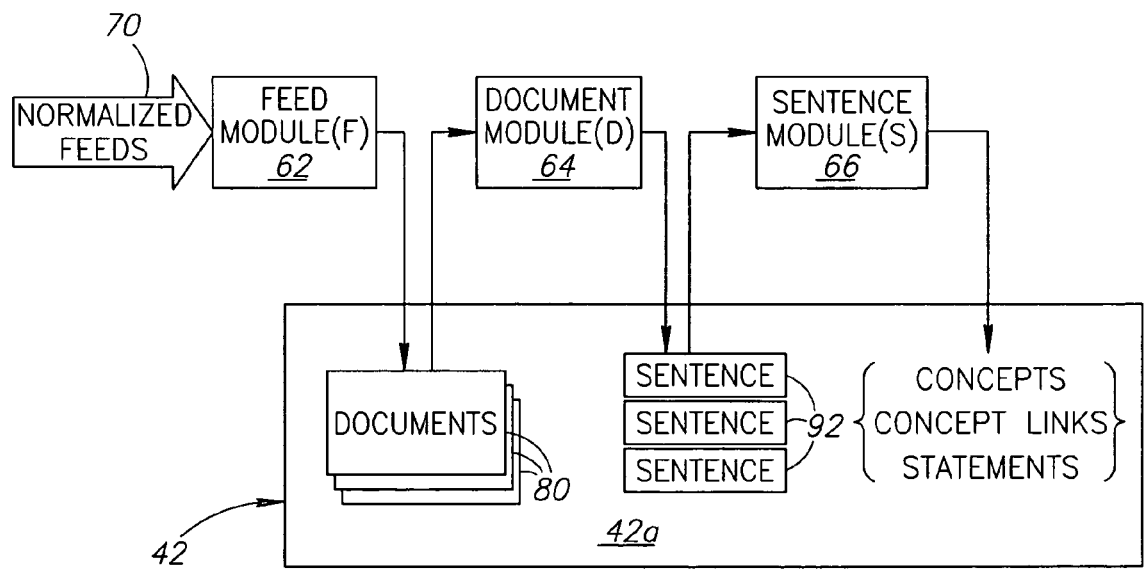
FIG. 3 is a schematic diagram of the architecture detailing the operation of the database population module.

The retrieval module ($R_1$-$R_n$) 60 typically receives data from external sources, for example, document stores, such as the store 26 (FIG. 1A), from the Internet 30 (FIGS. 1A and 1B), etc., in the form of raw feeds 45. The retrieval module ($R_1$-$R_n$) 60 places or pushes the retrieved data in the processing directory (PD) 68. An individual feed module ($F_1$-$F_n$) 62 moves (pushes) data from the processing directory (PD) 68, to a unique location in the working directory (WD) 69, exclusive to the particular feed module ($F_1$-$F_n$) 62. Each individual feed module ($F_1$-$F_n$) pulls data from its unique location in the working directory (WD) 69, for processing, as a normalized feed 70 (FIG. 3). The unique locations in the working directory (WD) 69, corresponding to an individual feed module ($F_1$-$F_n$) 62, preserve the integrity of the data in the file and/or document.

Throughout this document (as indicated above), "push", "pushed", "pushing" or variations thereof, includes data sent from one module, component, device, etc, to another module, component, device, etc., without a request being made from any of the modules, components, devices, etc., associated with the transfer of the data.

Raw feeds 45 are typically retrieved and stored. If the raw feed 45 exceeds a programmatic threshold in size, the raw feed 45 will be retrieved in segments, and stored in accordance with the segments, typically matching the threshold size, on the processing directory (PD) 68. The processing directory (PD) 68, is, for example, storage media, such as a local hard drive or network accessible hard drive. The raw feeds 45, typically either a single file or in segments, may also be archived on a file system, such as a hard drive or RAID system. The sources of the raw feeds 45 are typically polled over time for new raw feeds. When new raw feeds are found, they are retrieved (pulled) and typically stored on the processing directory (PD) 68.

Specifically, the feed modules ($F_1$-$F_n$) 62 are linked to the data store 42 to store processed documents pulled into the system. The feed modules ($F_1$-$F_n$) 62 parse feeds into documents and push the documents into the data store 42. The documents that are inserted (pushed) into the data store 42 are known as unprocessed documents.

The document modules ($D_1$-$D_n$) 64 are linked to the data store 42 to pull documents from the data store 42 and return extracted sentences from the documents to the data store 42. Typically, the document modules ($D_1$-$D_n$) 64 obtain an unprocessed document from the data store 42, and extract the sentences of the document. The documents are then marked as processed, and the extracted sentences are pushed into the data store 42. These sentences, pushed into the data store 42, by the document modules ($D_1$-$D_n$) 64, are known as unprocessed sentences.

The sentence modules ($S_1$-$S_n$) 66 are linked to the data store 42 to pull the unprocessed sentences from the data store 42. The unprocessed sentences are processed, and marked as processed, and pushed into the structured representation (SR) 42$a$ of the data store 42. Processing of the unprocessed sentences results in collections of syntactic relationships being obtained, that are returned to the data store 42 to increase the structured representation (SR) 42$a$ and/or increment indices on existing collections of syntactic relationships.

The retrieval modules ($R_1$-$R_n$) 60, feed modules ($F_1$-$F_n$) 62, document modules ($D_1$-$D_n$) 64, and sentence modules ($S_1$-$S_n$) 66 operate independently of each other. Their operation may be at different times, contemporaneous in time, or simultaneous, depending on the amount of data that is being processed. The feed modules ($F_1$-$F_n$) 62, place documents (typically by pushing) into the data store 42. One or more document modules ($D_1$-$D_n$) 64 query the data store 42 for documents. If documents are in the data store 42, each document module ($D_1$-$D_n$) 64 pulls the requisite documents.

The documents are processed, typically by being broken into sentences, and the sentences are returned (typically by being pushed) to the data store 42. One or more sentence modules ($S_1$-$S_n$) 66 query the data store 42 for sentences. If unprocessed sentences are in the data store 42, as many sentence modules ($S_1$-$S_n$) 66 as are necessary, to pull all of the sentences from the data store 42, are used. The sentence modules ($S_1$-$S_n$) 66 process the sentences into syntactic relationships, and return the processed output to the data store 42, to increase the structured representation (SR) 42$a$ and/or increment indices on existing syntactic relationships.

The database population module 44 includes all of the functionality required to create the structured representation (SR) 42$a$, that is supported in the data store 42. The database population module 44 is typically linked to at least one document storage unit 26, over a LAN or the like, as shown in FIG. 1A, or a server, such as servers 36$a$-36$n$, if in a public system such as the Internet 30, as shown in FIG. 1B, in order to pull digitized content (raw feeds 45), that will be processed into the structured representation (SR) 42$a$.

FIG. 3 shows an operational schematic diagram of the database population side of the architecture 40. The database population sequence, that occurs in the database population module 44, forms the structured representation (SR) 42$a$. For example, one or more normalized feeds 70 are pulled into a feed module (F) 62. Normalized feeds are feeds that have been stored in the working directory (WD) 69. In this figure, a single feed module (F) 62, a single document module (D) 64 and a single sentence module (S) 66 are shown as representative of the respective feed modules ($F_1$-$F_n$), document modules ($D_1$-$D_n$) and sentence modules ($S_1$-$S_n$), to explain the database (data store 42) population sequence.

Prior to the feed module (F) 62 retrieving the normalized feed 70 from the working directory (WD) 69, the retrieval module 60 (FIGS. 1A and 1B), has translated the raw feeds 45 (FIGS. 1A, 1B and 2) into files in formats usable by the feed module (F) 62. The retrieval module (R) 60 saves the now-translated files typically on the processing directory (PD) 68 or other similar storage media (PD 68 is representative of multiple processing directories). For example, Extensible Markup Language (XML) is one such format that is valid for the feed module(s) (F) 62.

The feed module (F) 62, is given the location of the processing directory (PD) 68, and will move a file or document from the processing directory (PD) 68 to a unique working directory (WD) 69 (WD 69 is representative of multiple working directories) for each individual running feed module (F) 62. The feed module (F) 62 then opens the file or document, and extracts the necessary document information, in order to create normalized document type data, or normalized documents 80.

Figure 4:
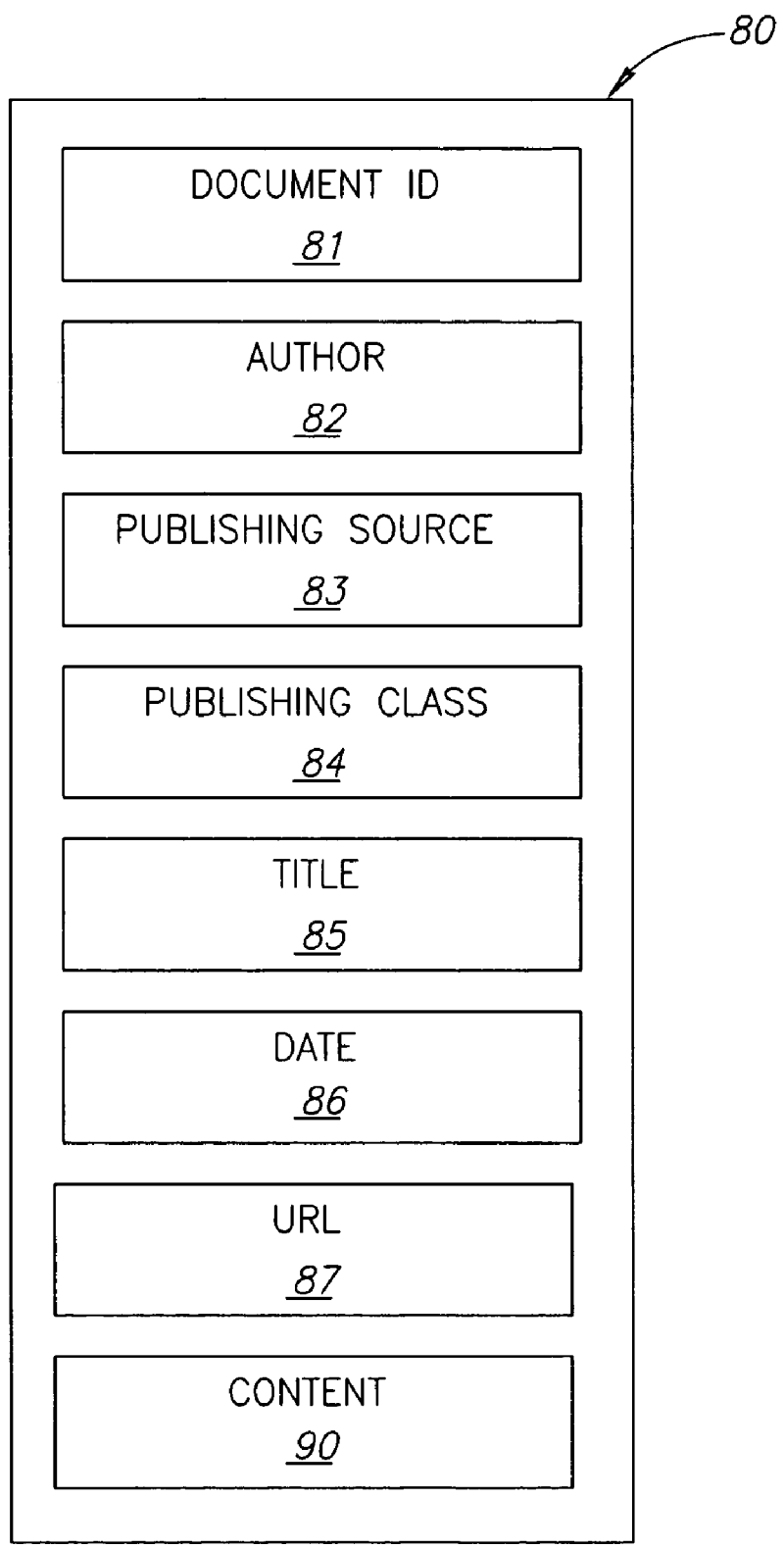
FIG. 4 is a schematic representation of a document produced in accordance with an embodiment of the invention.

FIG. 4 shows a normalized document 80 in detail, and attention is now directed to this Figure. The document 80, typically includes fields, that here, include attributes, for example, Document Identification (ID) 81, Author 82, Publishing Source 83, Publishing Class 84, Title 85, Date 86, Uniform Resource Locator (URL) 87, and content 90 (typically including text or textual material in natural language). Other fields, including additional attributes and the like are also permissible, provided they are recognized by the architecture 40.

The feed module (F) 62 isolates each field 81-87 and 90 in the document 80. Each field 81-87 and 90 is then stored in the structured representation (SR) 42$a$ of the data store 42, as a set of relational records (records based on the Relational Database Model). The fields 81-87 and 90 represent attributes, for the document 80 that remain stored for the purpose of ranking each document against other documents. The content from the content field 90 is further processed into its constituent sentences 92 by the document module (D) 64.

The document module (D) 64, splits the content of the content field 90 into valid input for the sentence module (S) 66, or other subsequent processing modules. For example, valid input includes constituent sentences 92 that form the content field 90. The content is split into sentences by applying, for example, Lingua::EN::Sentence, a publicly available PERL Module, attached hereto as Appendix A, and publicly available over the World Wide Web at www.cpan.org. To verify that only valid sentences have been isolated, the sentences are subjected to a byte frequency analysis. An exemplary byte frequency is detailed in M. McDaniel, et al., Content Based File Type Detection Algorithms, in Proceedings of the 36$^{th}$ Hawaii International Conference on System Sciences, IEEE 2002, this document incorporated by reference herein.

Figure 5A:
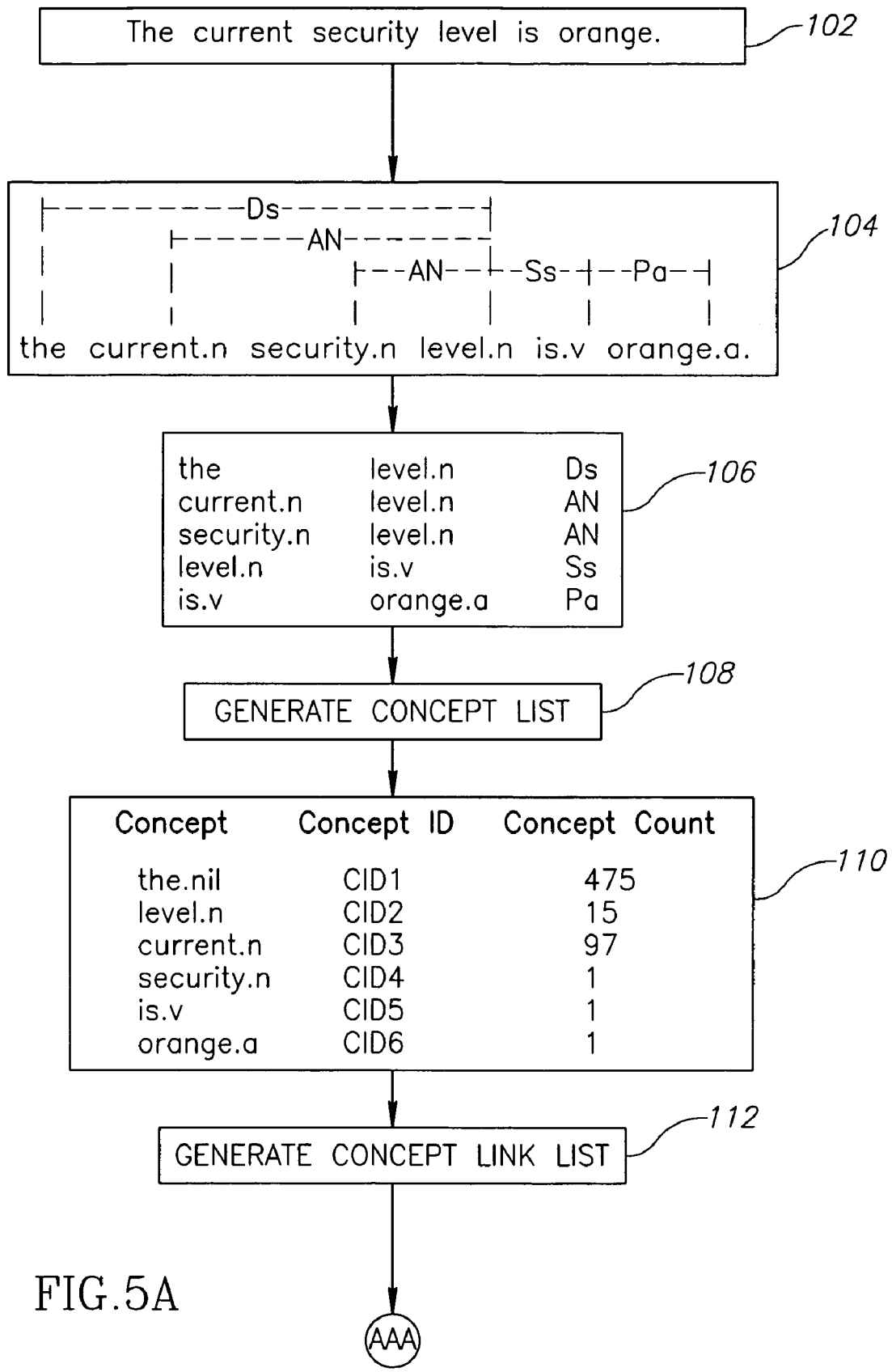
FIGS. 5A and 5B are a flow diagram of a process performed by the sentence module in accordance with an embodiment of the invention.
Figure 5B:
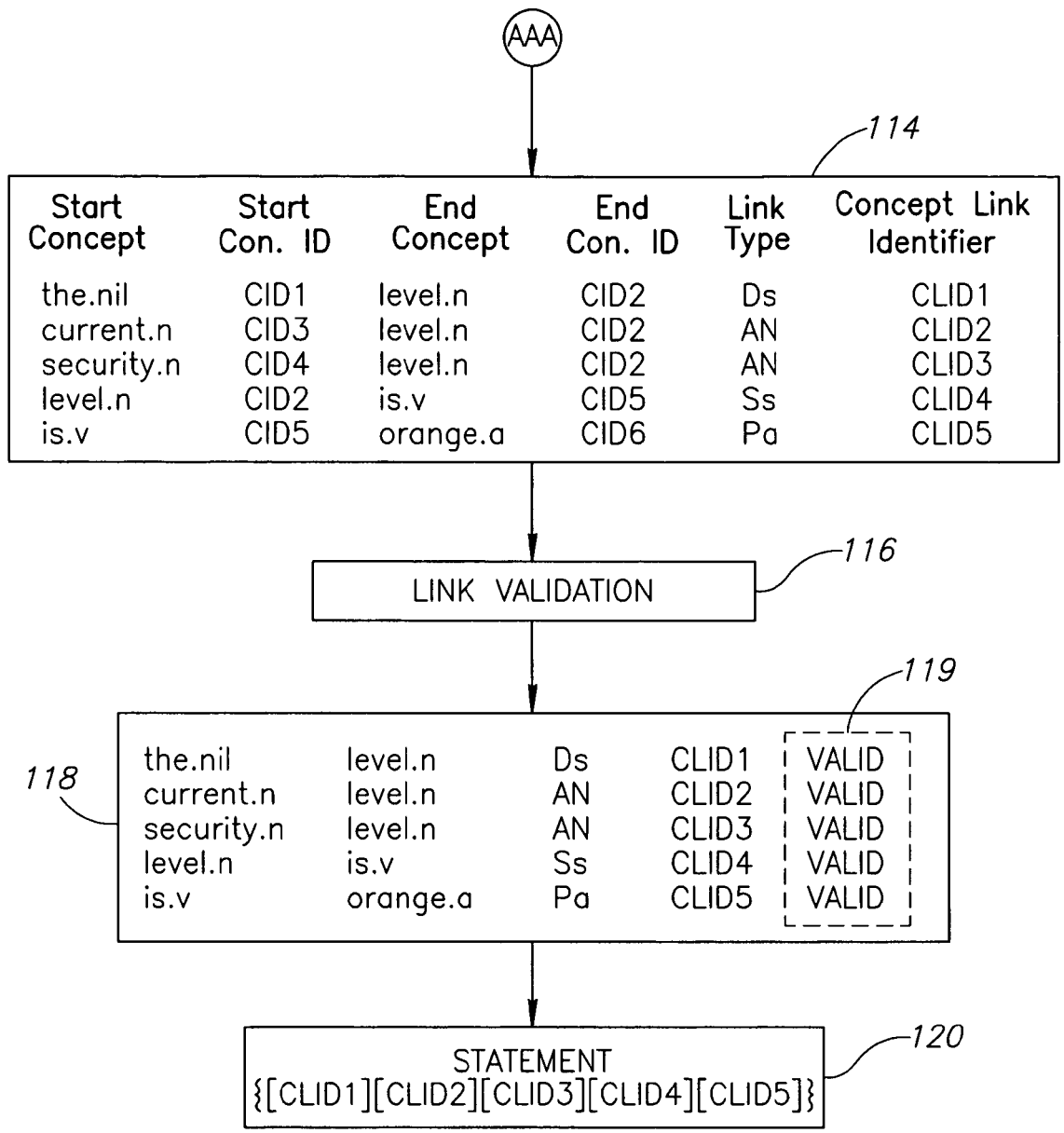

Turning also to FIGS. 5A-8, and specifically to FIGS. 5A and 5B (an exemplary operation of the sentence module (S) 66), the sentence module (S) 66 parses the sentence 92 into its grammatical components. These grammatical components may be defined as the constituent words of the sentence, their parts of speech, and their grammatical relationship to other words in the same sentence, or in some cases their relationships to words in other sentences, for example, pronouns.

The parsing is performed, for example, by the Link Grammar Parser (LGP or LGP parser), Version 4.1b, available from Carnegie Mellon University, Pittsburgh, Pa., and detailed in the document entitled: An Introduction to the Link Grammar Parser, attached as Appendix B, hereto, and in the document entitled: The Link Parser Application Program Interface (API), attached as Appendix C hereto, both documents also available on the World Wide Web at http://www.link.cs.cm-u.edu/link/dict/introduction.html. The LGP parser outputs the words contained in the sentence, identifies their parts of speech (where appropriate), and the grammatical syntactic relationships between pairs of words, where the parser recognizes those relationships.

The sentence module (S) 66, includes components that utilize the parse (parsed output), and perform operations on the parsed sentences or output to create the structured representation (SR) 42$a$. The operation of the sentence module (S) 66, including the operations on the parsed sentences, results in the structured representation (SR) 42$a$, as detailed below.

The sentence module (S) 66 uses the LGP (detailed above) to parse each sentence of each normalized document 80. The output of each parse is a series of words or portions thereof, with a concept sense, as detailed in the above mentioned document entitled: An Introduction to the Link Grammar Parser (Appendix B), with the words paired by relational connectors, or link types, as assigned by the LGP. These relational connectors or link types, as well as all other relational connectors or link types, are in described in the document entitled: Summary of Link Types, attached as Appendix D hereto.

In an exemplary operation of the sentence module (S) 66, the sentence module (S) 66 receives sentences from documents, typically one after another. An exemplary sentence received in the sentence module (S) 66 may be, the sentence 102 from a document, "The current security level is orange." The sentence 102 is parsed by the LGP, with the output of the parse shown in box 104.

In box 104, the output of the parsing provides most words in the sentence with a concept sense. While "the" does not have a concept sense, "current", "security" and "level" have been assigned the concept sense "n", indicating these words are nouns. The word "is" has a concept sense "v" next to it, indicating it is a verb, while "orange" has a concept sense "a" next to it, indicating it is an adjective. These concept senses are assigned by the LGP for purposes of its parsing operation. Assignments of concept senses by the LGP also include the failure to assign concept senses.

The output of the parsing also provides relational connectors between the designated word pairs. In box 104, the relational connectors or link types are "Ds", "AN" (two occurrences), "Ss" and "Pa". The definitions of these relational connectors are provided in Appendix C, as detailed above. The output of each parse is typically stored in the structured representation (SR) 42*a*.

The LGP parse of box 104 is then made into a table 106. The table 106 is formed by listing word pairs, as parsed in accordance with the LGP parse, each word with its concept sense (if it has a concept sense as per the LGP parse) and the LGP link type connector or relational connector. The process now moves to box 108, where a concept list 110 is generated, the process of generating the concept list described by reference to the flow diagram of FIG. 6, to which attention is now directed.

Figure 6:
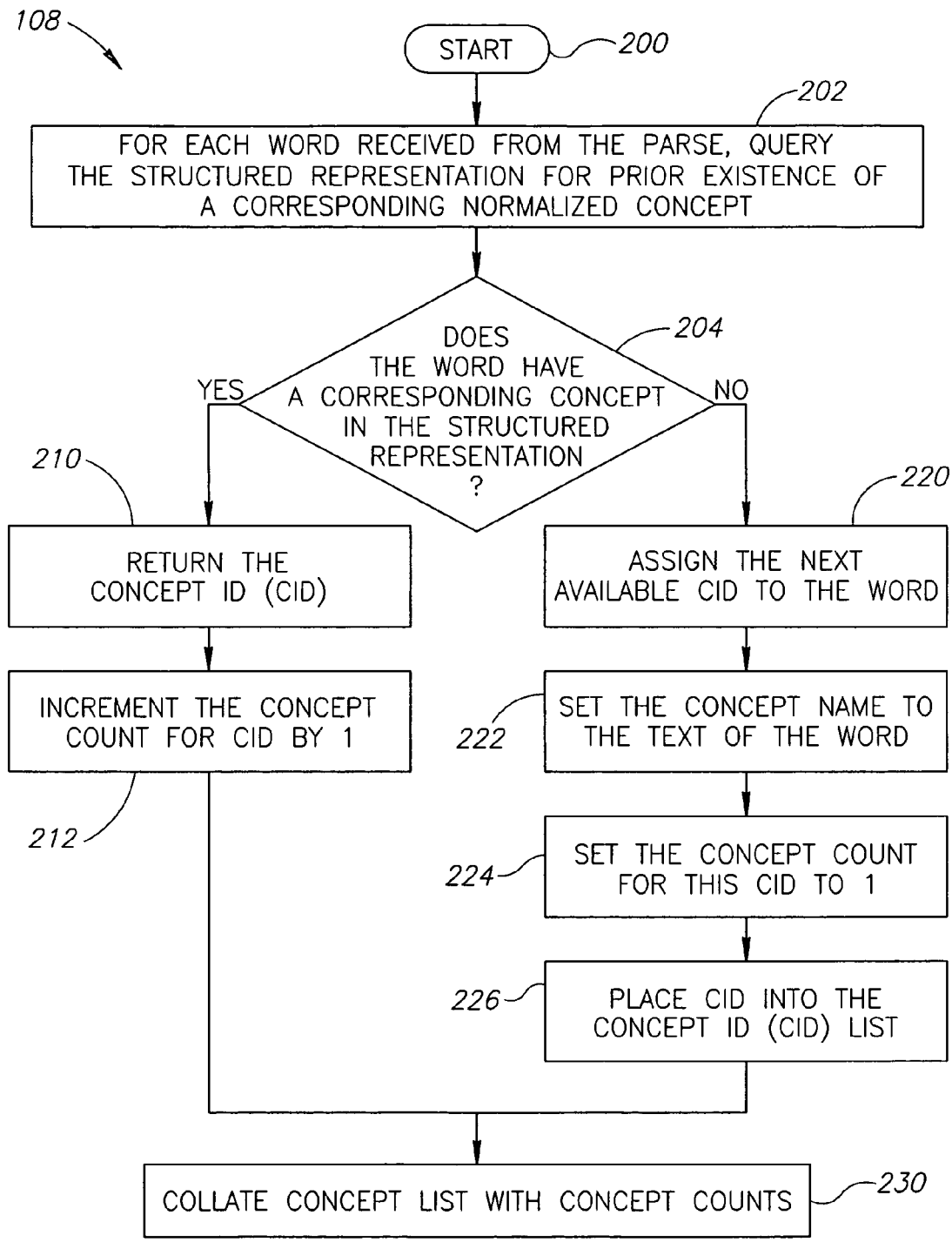
FIG. 6 is flow diagram detailing the sub process of generating a concept list in FIGS. 5A and 5B.
Figure 7A:
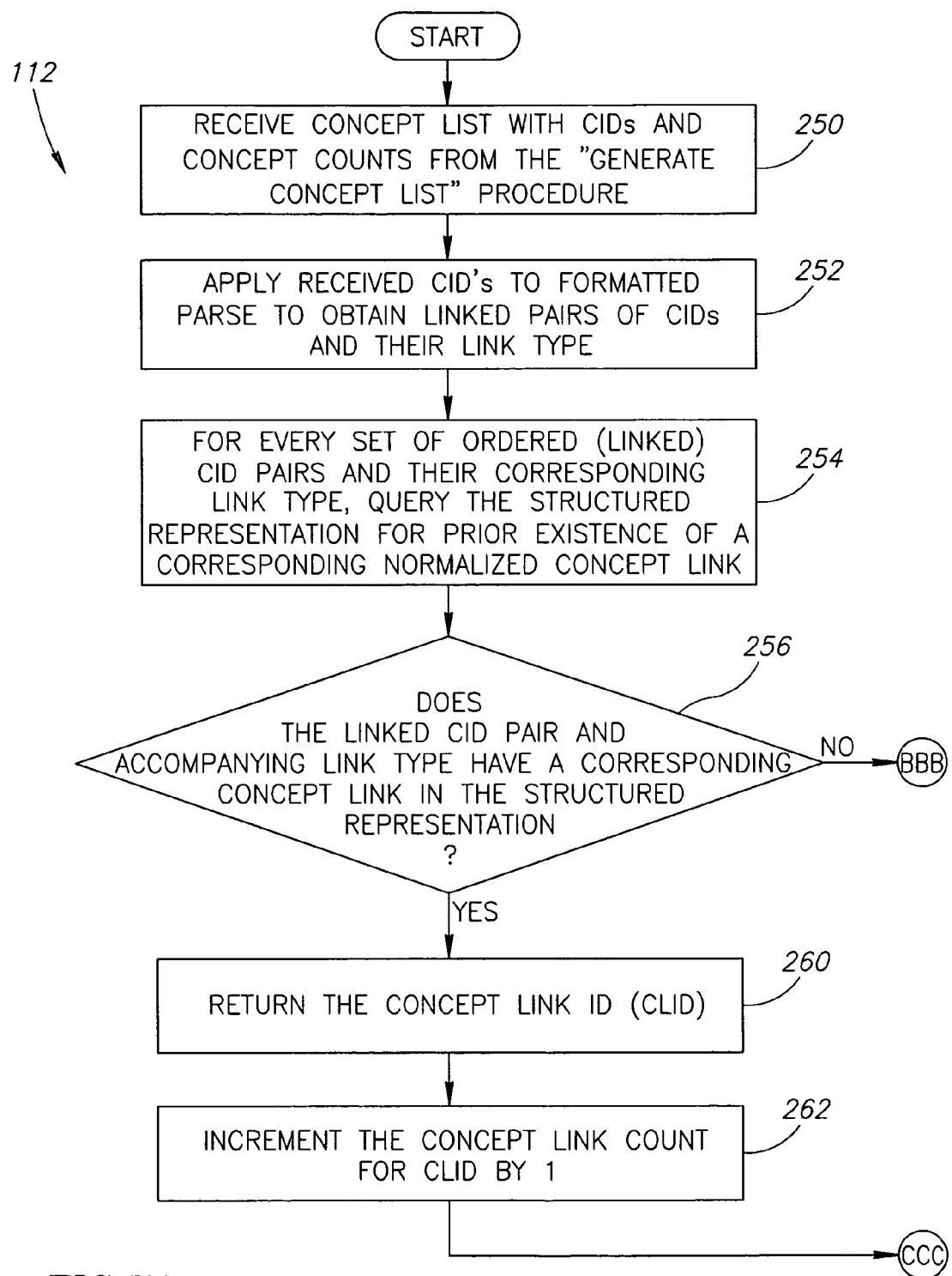
FIGS. 7A and 7B are a flow diagram detailing the sub process of generating concept links in FIGS. 5A and 5B.
Figure 7B:
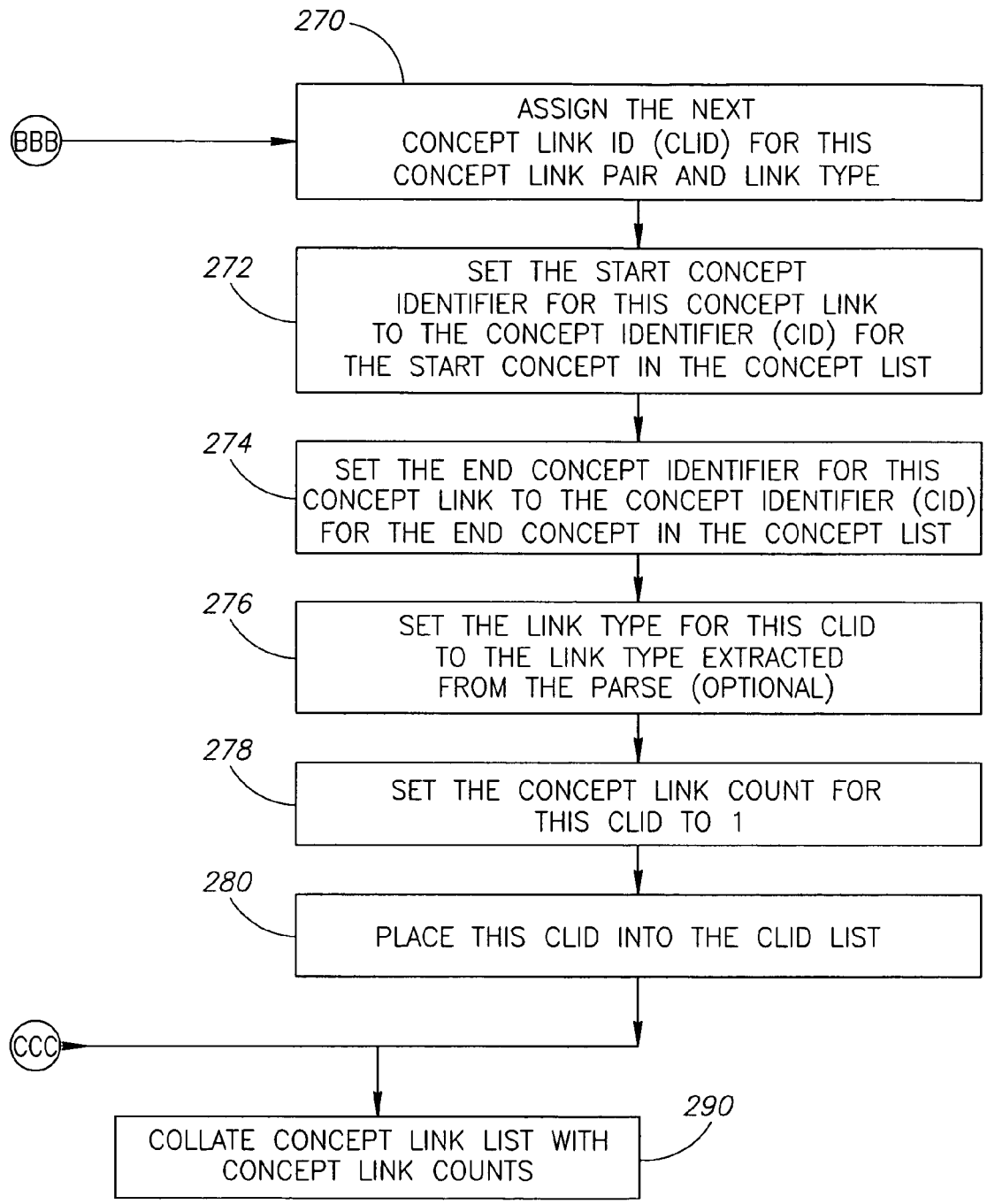
Figure 9A:
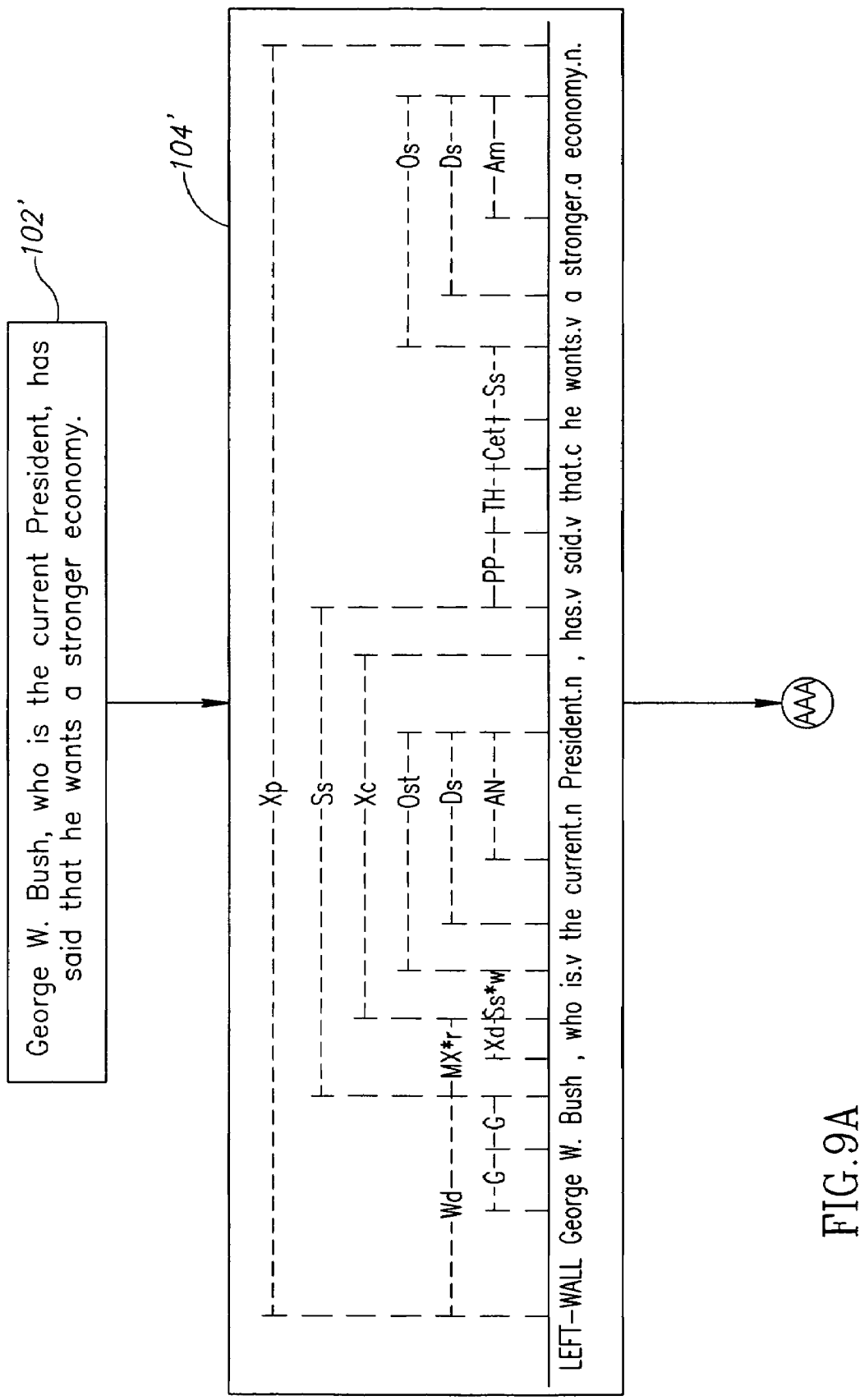
FIGS. 9A-9I are a flow diagram of a process performed by the sentence module in accordance with another embodiment of the invention.
Figure 9B:
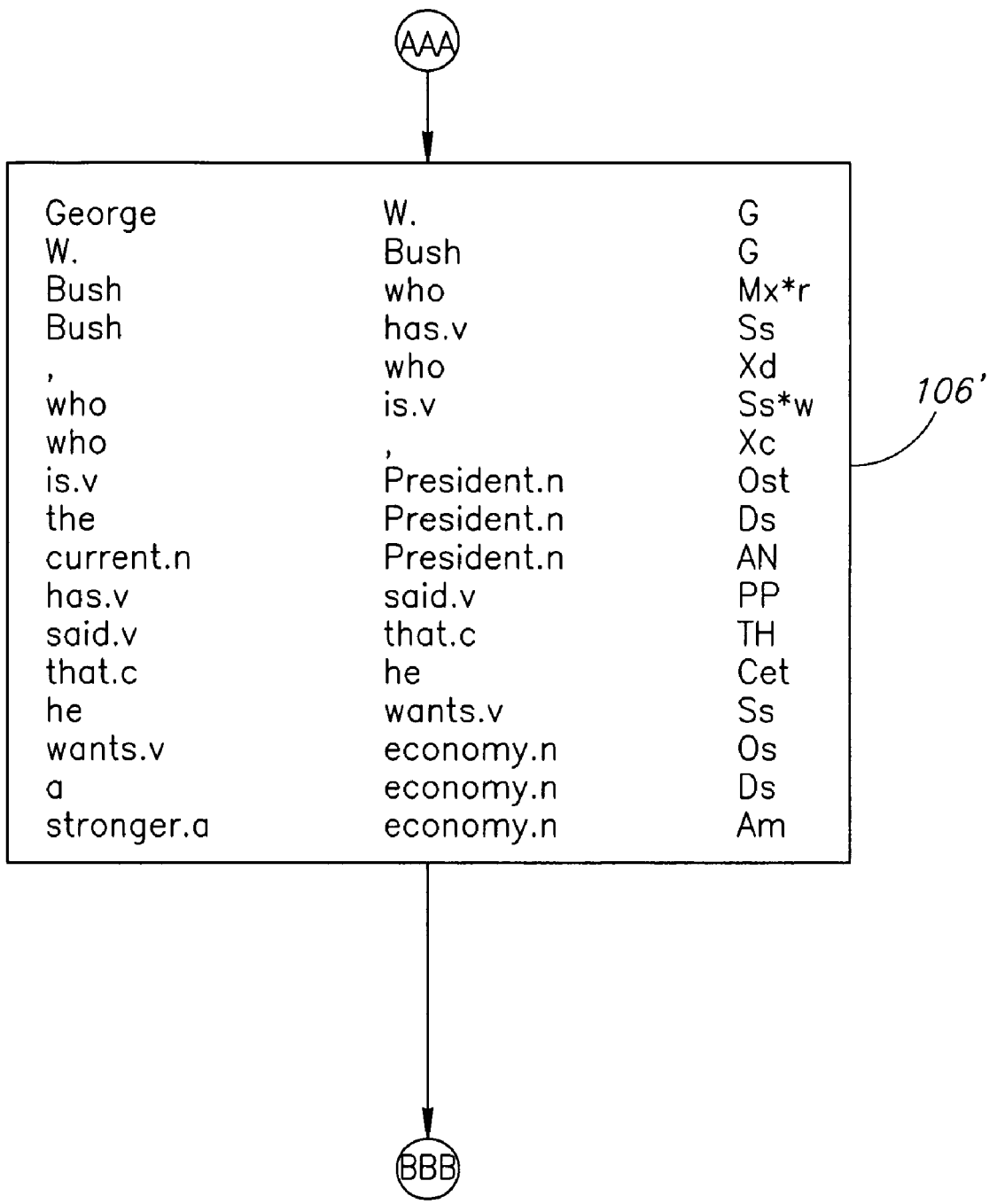
Figure 9C:
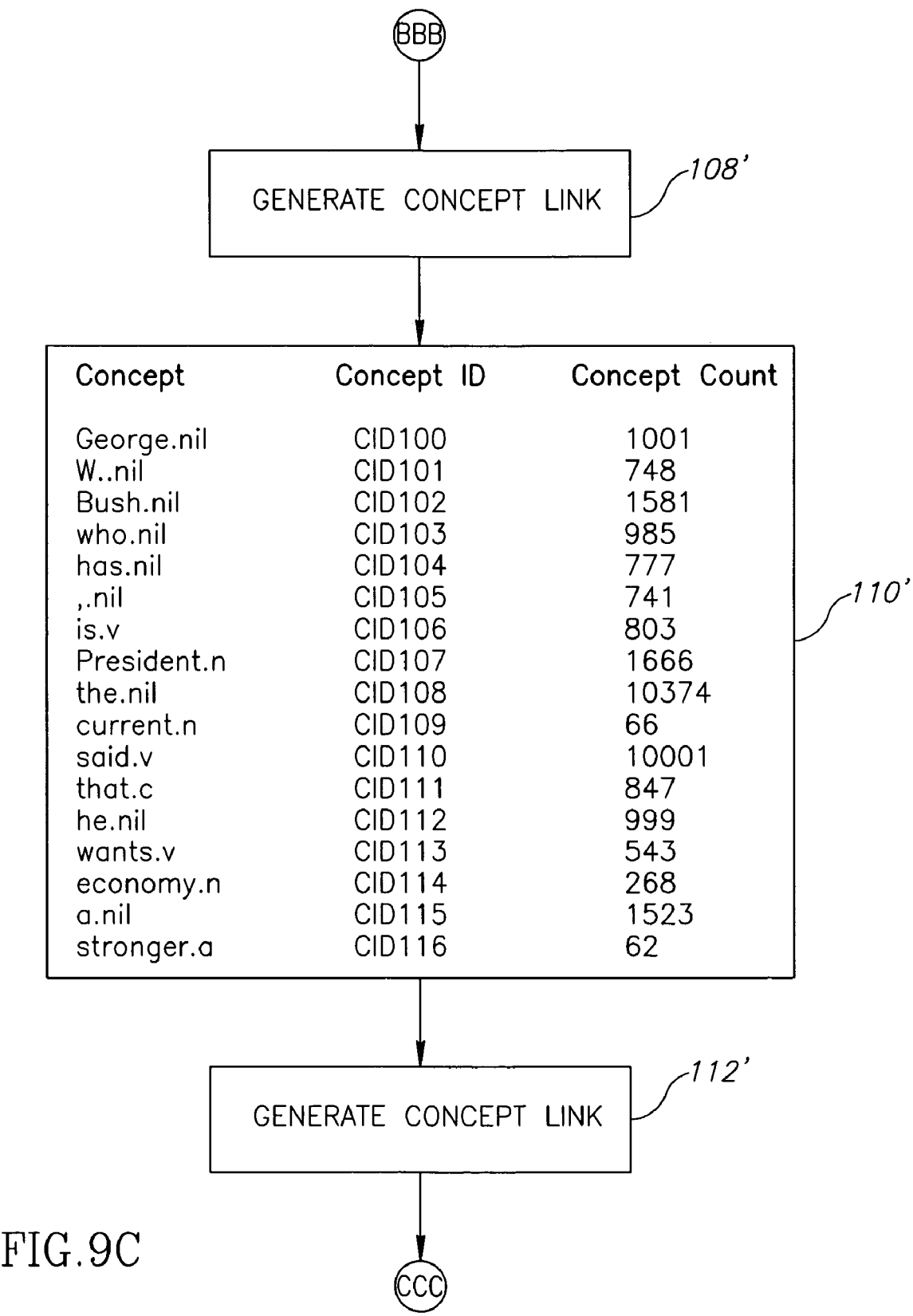
Figure 9D:
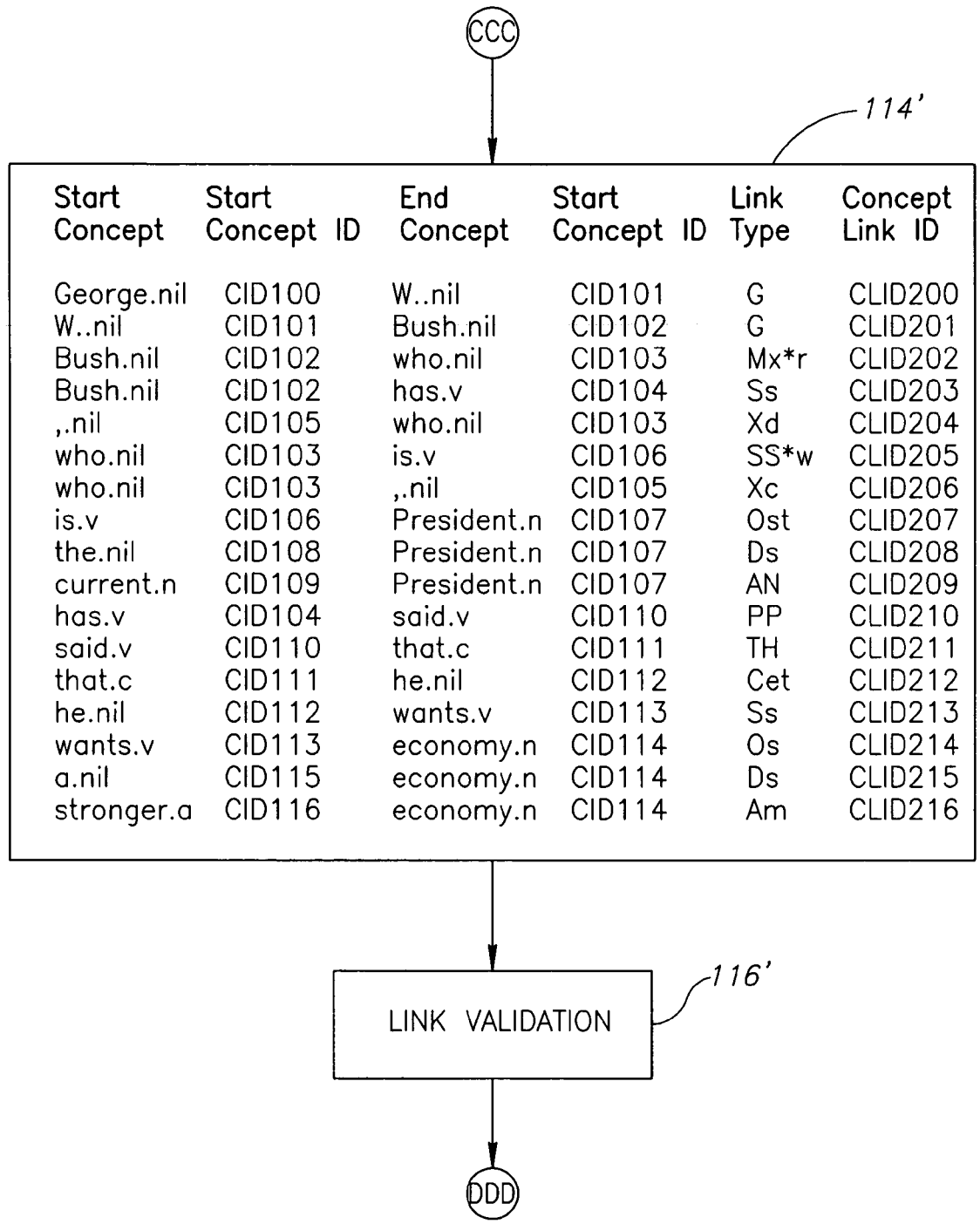
Figure 9E:
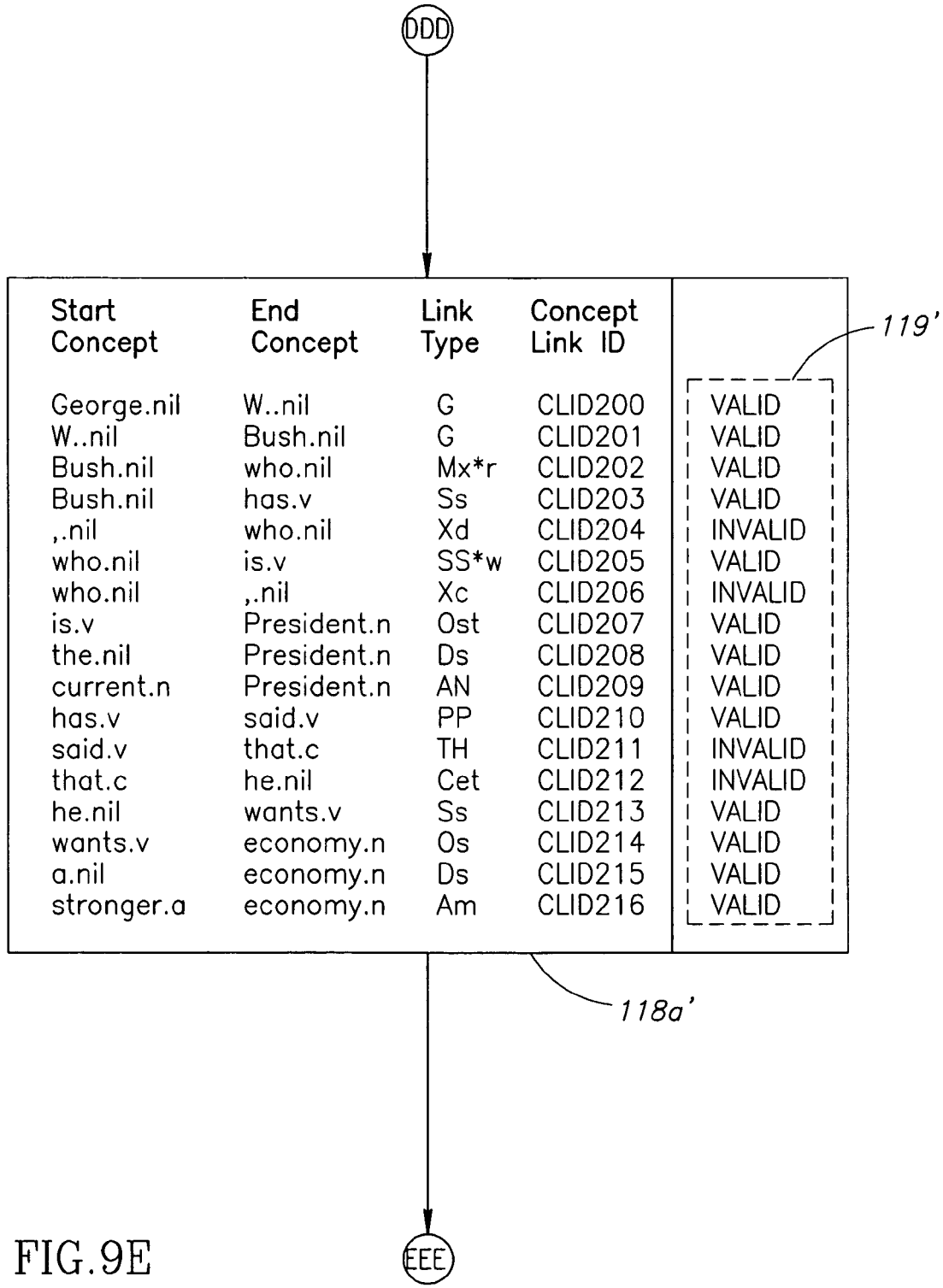
Figure 9F:
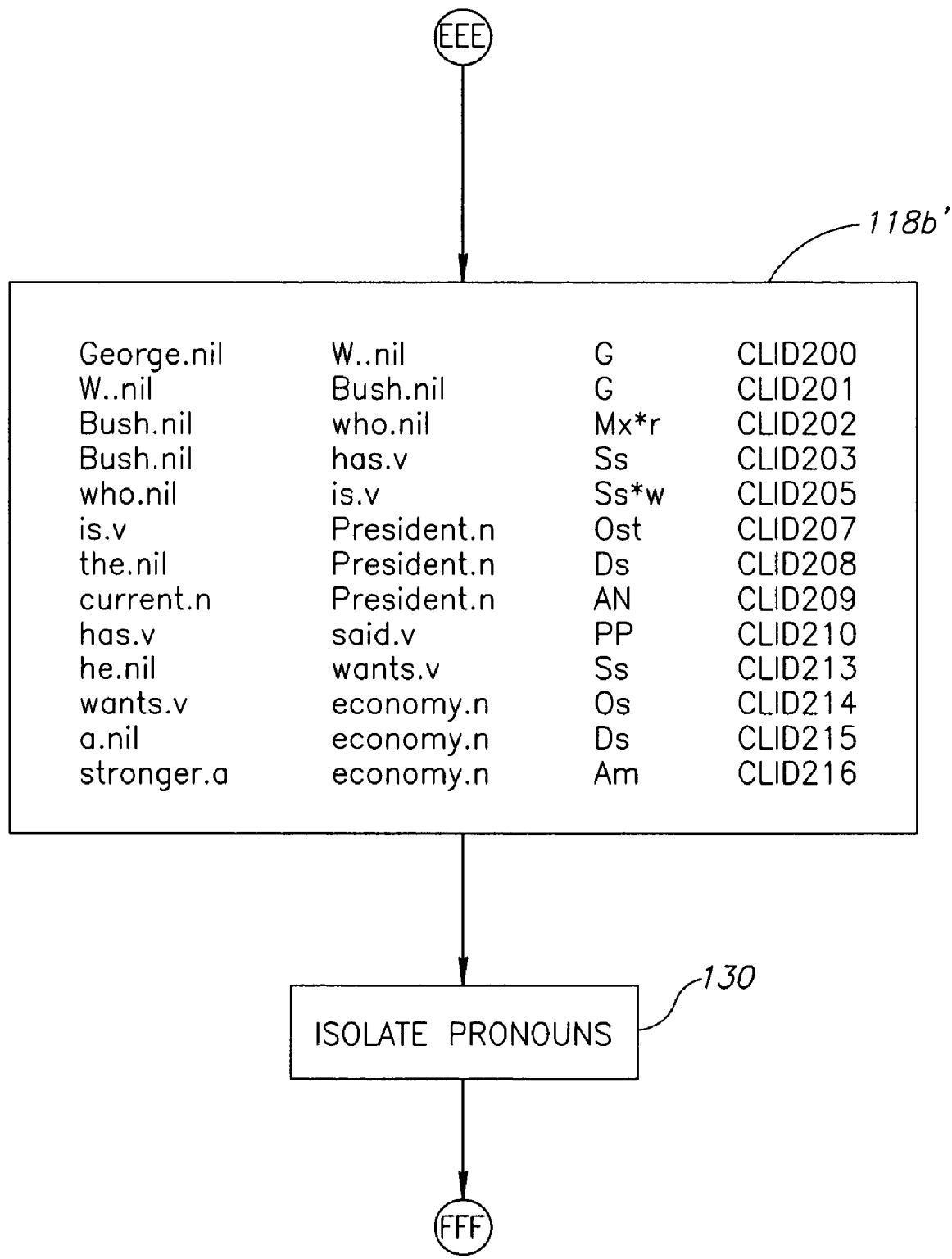
Figure 9G:
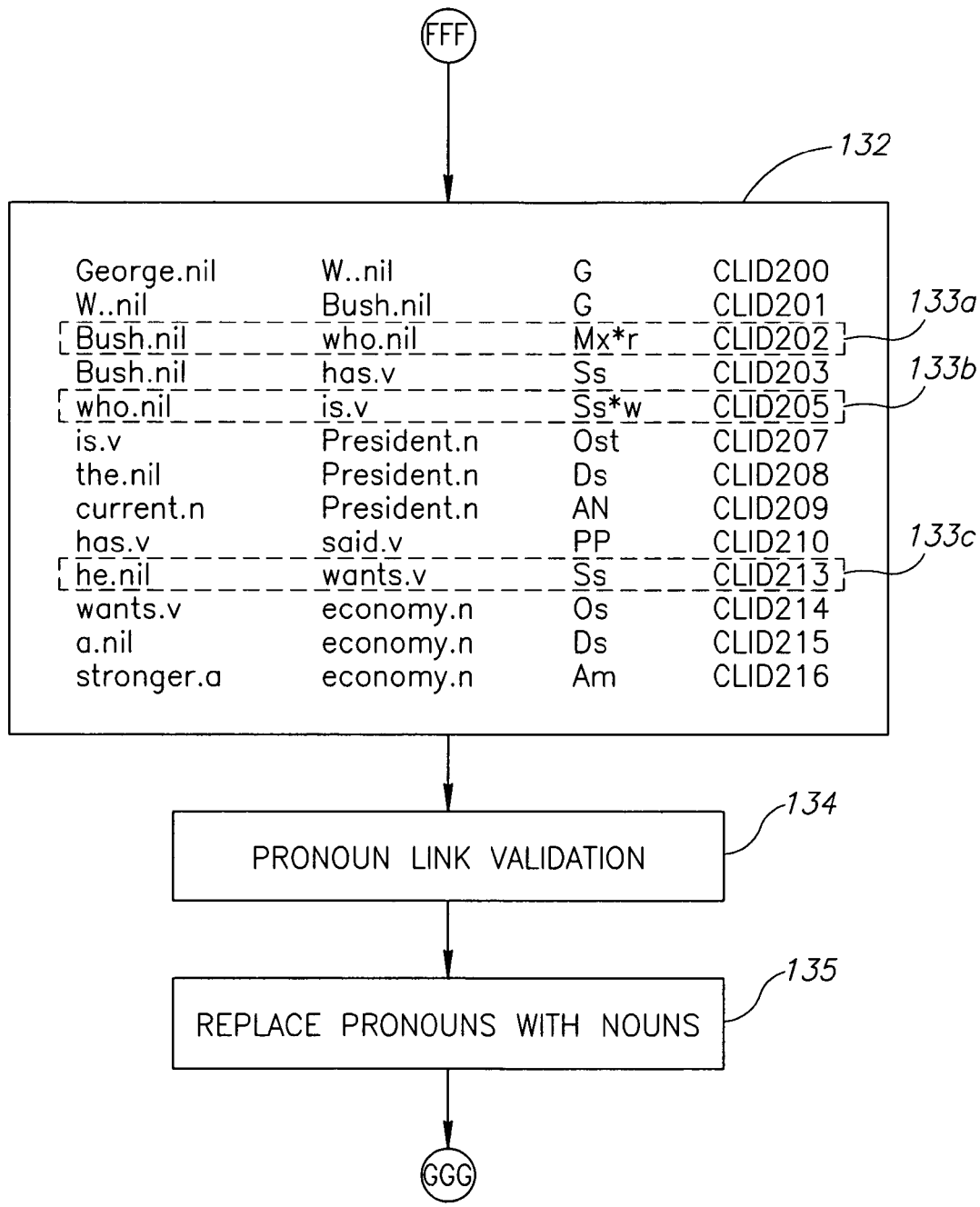
Figure 9H:
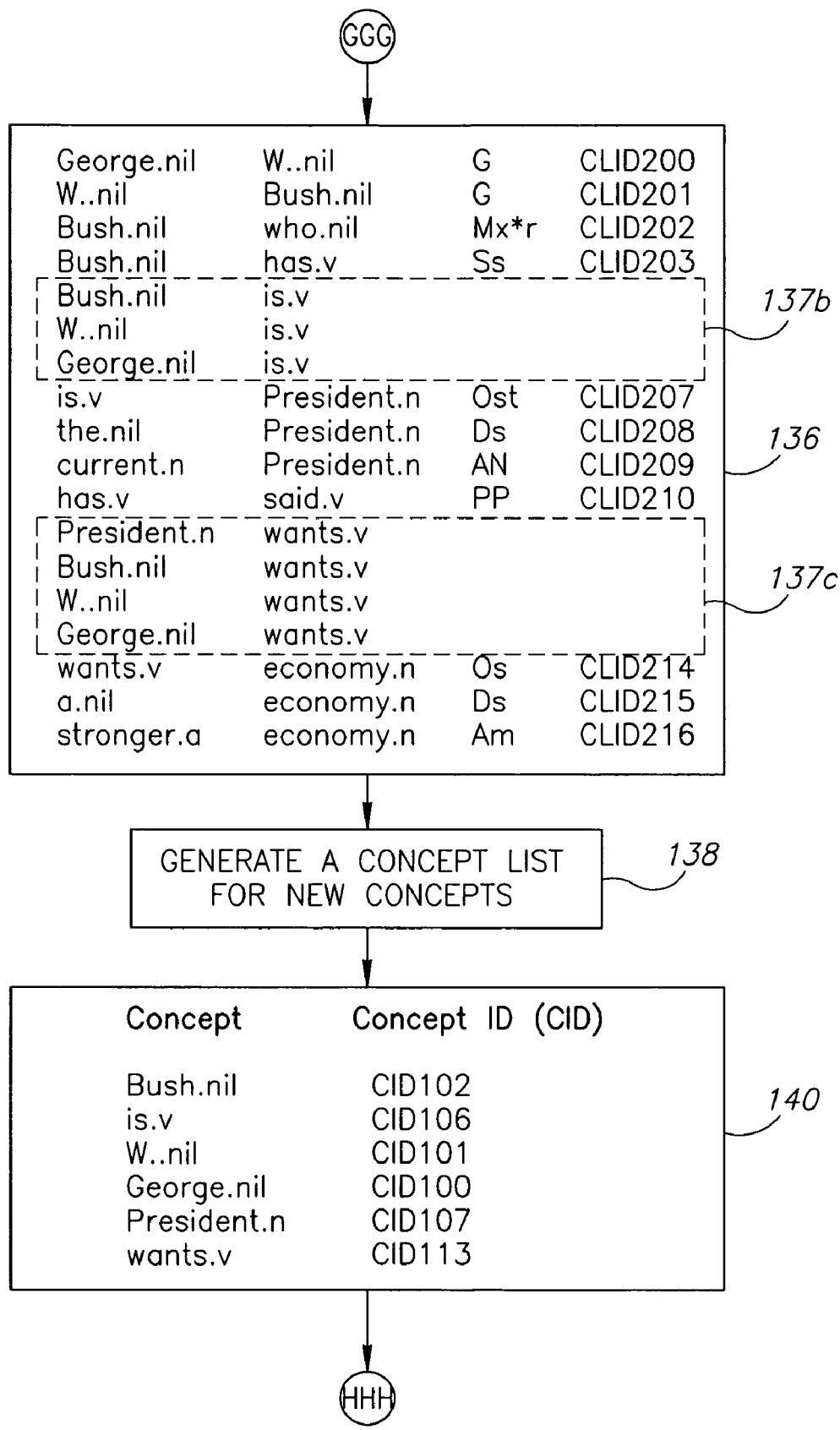
Figure 9I:
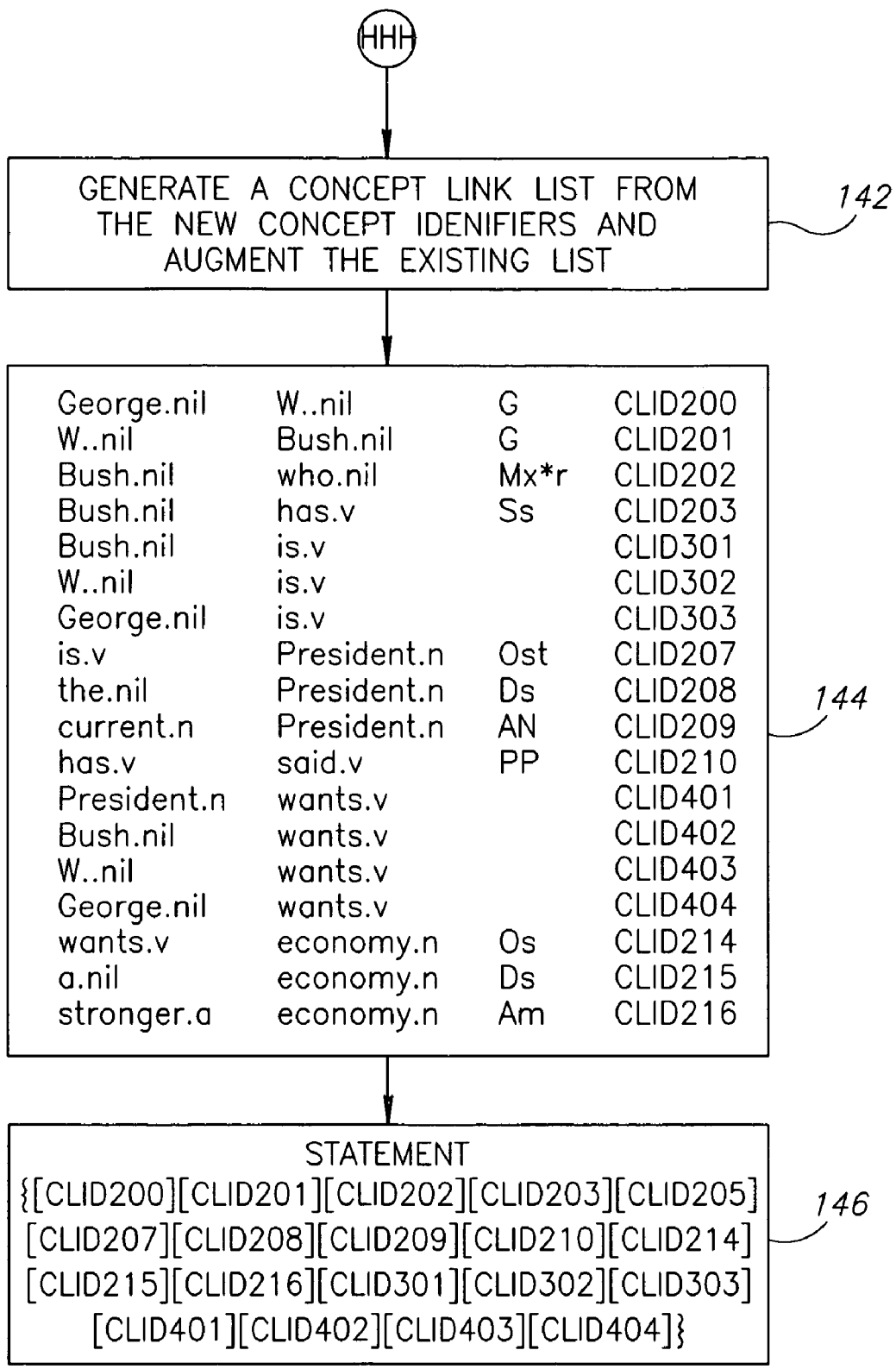

In FIG. 6, in block 200, a formatted parse from the LGP is received, and the parsed output is typically compiled into a table 106 (FIG. 5A). The compiling typically involves listing the parsed output as word pairs with their concept senses and link type connectors in an order going from left to right in the parsed output. Moving to block 202, each word from the LGP parse, typically the table of the parse, such as the table 106, is queried against the structured representation (SR) 42*a* for a prior existence of the corresponding normalized concept. At block 204, a decision is made whether or not the requisite word has a corresponding concept in the structured representation (SR) 42*a*.

If the word matches a concept in the structured representation (SR) 42*a*, the process moves to the sub process of block 210. If the word does not match any concept in the structured representation (SR) 42*a*, the process moves to the sub process of block 220.

At block 210, the word exists as a concept, as a matching word and concept sense, with a concept identifier (CID) was found in the structured representation (SR) 42*a*. Accordingly, the matching word with its concept sense is assigned the concept identifier (CID) of the matching (existing) word and its concept sense. The concept count in the database, for example, in the data store 42 or other storage media linked thereto, for this existing concept identifier (CID), is increased by 1, at block 212. The process now moves to block 230.

Turning to block 220, the word does not exist as a concept in the structured representation (SR) 42*a*. This is because a matching word and concept sense, with a concept identifier (CID), has not been found in the structured representation (SR) 42*a*. Accordingly, the next available concept identifier (CID) is assigned to this word. By assigning the word a concept identifier (CID), the word is now a concept, with the concept identifier being assigned in ascending sequential order. Also, if the LGP fails to provide a concept sense for the word, the word is assigned the default value of "nil". The concept sense "nil" is a place holder and does not serve any other functions.

A concept identifier (CID) is set to the text of the word, for the specific concept identifier (CID), at block 222. At block 224, the concept count for this new concept identifier is set to 1. The concept identifier (CID), developed at block 220, is now added or placed into to the list of concept identifiers (CIDs), such as the list 110, at block 226. The process moves to block 230.

At block 230, the words with their concept senses, corresponding concept identifiers (CIDs) and concept counts, are now collated into a list, such as a completed list for the sentence, such as the list 110.

The list 110 is now subject to the process of box 112, where concept links are generated. The process of box 112, is shown in detail in the flow diagram of FIGS. 7A and 7B, to which attention is now directed.

At block 250, the concept list, such as the list 110, is received. This list 110 includes the concepts, concept senses, concept identifiers and concept counts, as detailed above. Concept counts are typically used to classify existing words into parts of speech not traditionally associated with these words, but whose usage may have changed in accordance with contemporary language.

The concept identifiers (CIDs) for each concept are linked in accordance with their pairing in the parse, and their link types or relational connectors (as assigned by the LGP), at block 252. Also, in block 252, the concept identifiers are linked in ordered pairs, for example (CIDX, CIDY), such that the left concept identifier, CIDX, is the start concept, and the right concept identifier, CIDY, is the end concept.

The process moves to block 254, where each set of ordered concept identifier (CID) pairs and their corresponding link type (relational connector), are provided as a query to the structured representation (SR) 42*a* for a prior existence of a corresponding normalized concept link. At block 256, a decision is made whether or not the requisite concept identifier (CID) pair and its link type (relational connector), have a corresponding start concept, end concept, and link type, for a concept link in the structured representation (SR) 42*a*.

If the concept pair matches a concept link in the structured representation (SR) 42*a*, the process moves to block 260. If the concept pair does not match any concept link in the structured representation (SR) 42*a*, the process moves to block 270.

At block 260, the concept link exists in the structured representation (SR) 42*a*. Accordingly, the concept link is returned to or placed into a concept link identifier (CLID) list 114, with the existing concept link identifier (CLID). The concept link count in the database, for example, the data store 42 or storage media linked thereto, for this existing concept link identifier (CLID) is increased by 1, at block 262. The process now moves to block 290.

Turning to block 270, the concept pair and link type do not exist as a concept link in the structured representation (SR) 42*a*. Accordingly, the concept pair and link type, are assigned the next available concept link identifier (CLID). This new concept link identifier (CLID) is assigned typically in ascending sequential order. At block 272, the start concept identifier for this concept link identifier (CLID) is set to the concept identifier (CID) for the start concept in the concept list 110. At block 274, the end concept identifier for this concept link identifier (CLID) is set to the concept identifier (CID) for the end concept in the concept list 110.

The process moves to block 276, where the link type for this concept link identifier (CLID) is set to the link type from the parse. For example, the parse is in accordance with the table 106 (detailed above). This sub process at block 276 is optional. Accordingly, the process may move directly from block 274 to block 278, if desired.

The concept link identifier (CLID) count, for this concept link identifier (CLID) is set to "1", at block 278. The new concept link identifier (CLID) is placed into the list of concept link identifiers (CLIDs), such as the list 114, at block 280. The process moves to block 290.

At block 290, the concept link identifiers (CLIDs) with their corresponding concepts, concept senses, links types and concept links, are collated (arranged in a logical sequence, typically a first in, first out (FIFO) order) and provided as a completed list for the sentence, such as, for example, the list 114.

Each of the concept links of the list 114 is subject to validation, at box 116. Validation may use one or more processes. For example, the link validation process of box 116 may be performed by two functions, an IS_VALID_LINK function and a stop word function. The IS_VALID_LINK function and the stop word function are independent of each other. These functions are typically complimentary to each other.

The functions typically operate contemporaneous or near in time to each other. These functions can also operate on the list one after the other, with no particular order preferred. They can also operate simultaneously with respect to each other. Both functions are typically applied to the linked concepts of the list 114, before each link of the list 114 is placed into the resultant list, for example, the resultant list 118. However, it is preferred that both functions have been applied completely to the list 114, before the resultant list 118 has been completed.

The IS_VALID_LINK function is a process where concept links are determined to be valid or invalid. This function examines the concepts and their positions in the pair of linked concepts. This function is in accordance with three rules. These rules are as follows, in accordance with Boolean logic:

IF the end or second concept is a noun, THEN, make the concept link VALID; OR

IF the end or second concept is a verb, AND the start or first concept is a noun OR an adverb, THEN, make the concept link VALID; OR OTHERWISE, make the concept link INVALID.

If the end or right concept is a noun, the concept link is always valid. However, if the end or right concept is a verb, the start or left concept must be either a noun or adverb, for the concept link to be valid. Otherwise, the concept link is invalid.

The stop word function is a function that only invalidates concept links. Stop words include, for example, words or concepts including portions of words, symbols, characters, marks, as defined above, as "words", that based on their position, start concept or end concept, in the concept link, will either render the concept link valid or invalid. The stop words of the stop word function are provided in the Stop Word Table (or Table) of FIG. 8. In this Table, the stop words are listed as concepts.

Turning to an example, in the Table of FIG. 8, for an explanation of the Table, the word "a" is a concept. As indicated in the table, "a" is considered valid (VALID) in the start position (of an ordered pair of concepts) and invalid (INVALID) in the end position (of an ordered pair of concepts). This means that "a" is acceptable as the start concept of a concept link, but not acceptable as the end concept of concept link. If a concept link containing "a" in the start position is placed into a list, such as the list 118, it its validity value is not changed, since according to the Table, "a" is acceptable in the start position of a concept link. Alternatively, if "a" appears in the end concept position of a link, that link is rendered invalid, based on the INVALID entry in the Stop Word Table of FIG. 8, for the concept "a".

Concept links and their corresponding concept link identifiers (CLIDs), flagged as INVALID are maintained in the structured representation (SR) 42a. However, as detailed below, if this invalid concept link results from the parsed output of the query, the concept link identifier for an invalid concept link is not listed in the resultant query statement (blocks 310 and 312 of FIGS. 10A and 10B).

The concept links of the list 114 are then reformed into a list 118, with the concept links noted, for example, by being flagged, as either valid or invalid, as shown in the broken line box 119 (not part of the table 118 but shown for description purposes). These valid and invalid concept links are reexamined every time the link is seen. The concept link identifiers are then grouped to form a statement, at box 120. A "statement", as used in this document (as indicated above), is a set of concept links (concept link identifiers) that corresponds to a parse of a particular sentence (from its natural language). An exemplary statement formed from the list 118 is: {[CLID1] [CLID2] [CLID3] [CLID4] [CLID5]}, of box 120.

The statements represent syntactic relationships between the words in the sentences, and in particular, a collection of syntactic relationships between the words or concepts of the sentence from which they were taken. The statements, along with concepts, and concept links populate the structured representation (SR) 42a. The aforementioned process operates continuously on all of the sentences, for as long as necessary.

FIGS. 9A-9I, to which attention is now directed, show an additional exemplary operation of the sentence module (S) 66. This exemplary operation is directed to pronoun handling (also known as pronoun replacement), a process for detecting pronouns in sentences, determining the nouns to which the pronouns are equivalent, and, replacing the pronouns with the equivalent one or more nouns in the concept links, derived from the requisite sentence. "Nouns", as used here to replace the pronouns, represent persons, places or things, and may include proper nouns, such as names (given and family), initials, titles (Mr. Mrs., Dr., Hon., etc.), and suffixes (e.g., Senior, Junior, III, etc.).

A set of concept links is ultimately created for each sentence, with the additional concept links, created by replacing the pronoun in a concept link with an equivalent noun, added to the set of concept links for each sentence, to define an augmented set of concept links. The process of pronoun handling continues, as the augmented set of concept links for each sentence is made into a statement, that forms a portion of the structured representation (SR) 42a. The statements in the structured representation (SR) 42a, with a potentially increased number of concept links, due to the pronouns being replaced with nouns to form one of more additional concept links, may generate a more precise answer to an entered query, as the added concept links provide an increased probability of a statement having concept links matching one or more the concept links of a query, derived from the words of the entered query.

The sentence module (S) 66 is described above, and includes, or is associated with, storage, data bases, data arrays, and the like for receiving and storing words that are pronouns, in accordance with English language grammar, or as designated by the system administrator. These pronouns are stored in the storage, data bases, data arrays and the like, as detailed below, and are applied as detailed below. The sentence module (S) 66 is also modified with hardware, software or combinations thereof to perform the processes associated with pronoun handling as described herein.

An exemplary sentence, "George W. Bush, who is the current President, has said that he wants a stronger economy.", is used to show the process of pronoun handling. This sentence includes the pronouns "who' and "he", which is the subject of the pronoun handling.

The sentence 102' is parsed, for example, by the LGP, with the exemplary output of the LGP Parse shown in box 104'. Throughout this description of FIGS. 9A-9I, boxes indicated by a prime (') after the number are similar to their corresponding numbered boxes (of FIGS. 5A-8) and as detailed above, with any differences described. Specifically, the process of pronoun handling includes subprocesses similar to those of the process described above, with boxes 102, 104, 106, 108, 110, 112, 114, and 116 of FIGS. 5A-8, as described above, corresponding to boxes 102', 104', 106', 108' 110' 112', 114', and 116', respectively.

The parsed output is compiled into a table 106', where words are grouped, the groupings typically being pairs. The process moves to box 108', where a concept list 110' is generated in accordance with the flow diagram 108 of FIG. 6, and as detailed above. The concept list 110' is subjected to the process of box 112', where concept links are generated, leading to the formation of concept link identifiers (CLIDs). The process of box 112' is in accordance with the flow diagrams 112 of FIGS. 7A and 7B, and as detailed above, such that the list of box 114' is generated. The list of box 114' is subjected to the link validation process of box 116'and the Table of FIG. 8, and as detailed above.

The concept links of the list 114', upon being subjected to the link validation process of block 116', are reformed into the list of box 118a'. In the list 118a', the concept links are flagged, as either valid or invalid, as shown in the broken line box 119'. Invalid links (concept links) are then removed (from the list 118a'), leaving the list of valid concept links 118b'.

Pronouns from the list 118b' are isolated, at box 130, if any of these pronouns match pronouns of a predetermined list of pronouns, that are stored in a data base, data array, or the like, typically in the sentence module (S) 66. Specifically, the pronouns of the predetermined list are compared, by a comparator function or the like, against pronouns in the list 118b' for matches. If there is a match of at least one pronoun, the pronoun(s) are identified, and pronoun handling or processing continues. If there is not at least one match of a pronoun, the Concept Link Identifiers (CLIDs) are made into a statement, in accordance with box 120 of FIGS. 5A and 5B, as detailed above.

For example, as the predetermined list of the pronoun data base or data array includes "who" and "he", there are matches. Accordingly, the concept links including "who" (in two occurrences) and "he" (in one occurrence) are isolated, as shown in box 132, by the broken line boxes 133a, 133b and 133c. An example data base or data array may store the words "I", "you", "he", "she", "it", "we", "who" and "they", as the pronouns, as these words are typically defined as pronouns in accordance with English language grammar.

The process moves to box 134, where a pronoun link validation process is performed on the links that include the pronouns. Here, the pronoun link validation process is performed on the concept links that include the isolated and identified pronouns, for example, broken line boxes 133a, 133b and 133c. The link validation process used is, for example, based on predetermined relational connectors. In this process, the relational connector "Mx*r" is considered to be an invalid link for pronoun replacement (block 135). Accordingly, the concept link "Bush.nil who.nil", of box 133a has the relational connector "Mx*r" while the concept links of boxes 133b and 133c do not have this relational connector. By matching relational connectors, the concept link of box 133a (Bush.nil who.nil) remains, and is not subjected to pronoun replacement, while the concept links of boxes 133b (who.nil is.v) and 133c (he.nil wants.v) will be subject to pronoun replacement. While a process based on relational connectors is shown as the pronoun link validation process (of block 134), any other link validation process may be used to determine validity of the concept links that include pronouns.

The process moves to box 135, where the pronouns, for example, the pronouns "who" and "he" are replaced by one or more corresponding nouns. The process of replacing the pronouns with corresponding nouns involves a sliding scale, based on the location of each noun with respect to the pronoun that is to be replaced, in the sentence itself, or surrounding sentences.

Figures 10A, 10B, 10C:
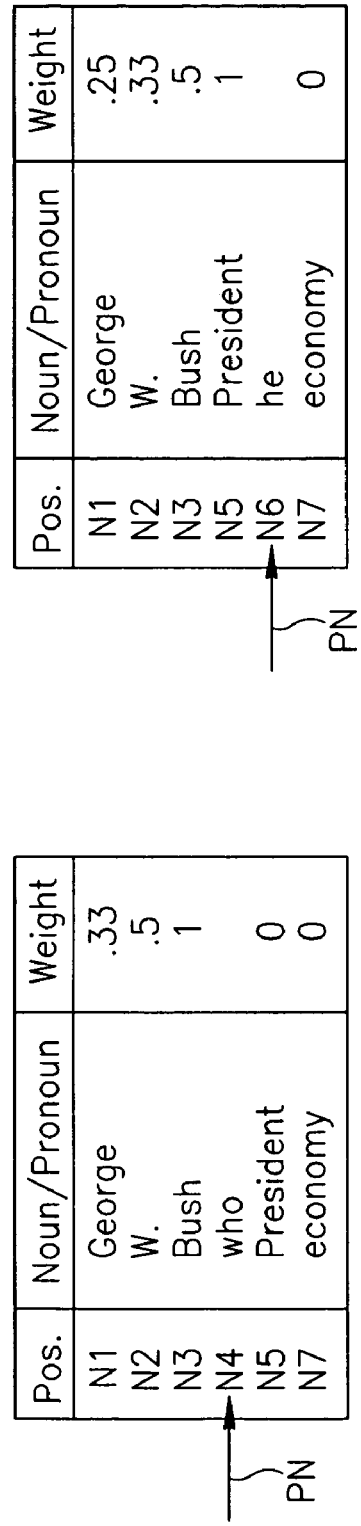
FIGS. 10A-10C are diagrams showing sub processes of FIGS. 9A-9I.

The sliding scale is illustrated, for example, in FIG. 10A. The sliding scale is developed as labels, N1-N7, are assigned to the nouns and pronouns in the sentence, in accordance with their sequential order in the sentence. The nouns, N1-N7, are typically isolated by a parse (secondary parse based on the initial or primary parse of the sentence into linked pairs of words) or other similar operation, that isolates nouns. The nouns are typically considered to be nouns by either the concept sense "n", the relational connector associated with the word pair in which the potential noun is a member, proper names and initials, and other words programmed into the sentence module (S) 66 (for example, by the programmer, system administrator or the like). Additionally, the sentence module (S) 66 may be programmed such that words, that are nouns in the English language, as well as words with the concept sense ".n" are not nouns for the process of pronoun handling.

A table of parsed or isolated nouns is made at FIGS. 10B and 10C, with the pronouns "who" and "he", respectively, indicated by the arrow PN. For example, in the table of FIG. 10B, the nouns "Bush" (N3), "W." (N2) and "George" (N1) are in front of the pronoun "who" (N4), while in the table of FIG. 10B, the nouns, "President" (N5), "Bush" (N3), "W." (N2) and "George" (N1), are in front of the pronoun "he" (N5). These nouns in front of the respective pronouns "who" and "he" are the replacement nouns, and are assigned values in accordance with a noun proximity (d), the occurrence of a noun at the relative distance from the pronoun.

For example, here, certain words, although they appear to be nouns are not nouns in FIG. 10A, as they are preprogrammed not to be nouns. This is such for "current.n", that has been preprogrammed so as not to be considered a noun.

Accordingly, referring to FIGS. 10A and 10B, for the pronoun "who", the nouns, "Bush" (N3), is such that d=1, "W." (N2), is such that d=0.5, and "George" (N1), is such that d=0.33. Similarly, referring to FIGS. 10A and 10C, for the pronoun "he", the nouns, "President" (N5), is such that d=1, "Bush" (N3), is such that d=0.5, "W." (N2), is such that d=0.33, and "George" (N1), is such that d=0.25. These values correspond to weights used when selecting the most precise statement, for the response to the query, as detailed below.

The pronoun "who", is then replaced in the concept link (with "is.v" as the end concept), with "Bush.nil", "W.nil" and "George.nil". This replacement creates three new concept links (with "is.v" as the end concept), as per the list 136 (the three new concept links in the broken line box 137b). Accordingly, the three new concept links of broken line box 137b have replaced the concept link of box 133b (with the pronoun "who").

The pronoun "he" is then replaced in the concept link (with "wants.v" as the end concept), with "President.n", "Bush-.nil", "W..nil" and "George.nil". This replacement creates four new concept links (with "wants.v" as the end concept), as per the list 136 (the four new concept links in the broken line box 137*c*). Accordingly, the four new concept links of broken line box 137*c* have replaced the concept link of box 133*c* (with the pronoun "he").

For each new concept of the new linked concepts, a concept list is generated, at box 138. Generation of the concept list for these new concepts is in accordance with boxes 108 and 108', and the flow diagram of FIG. 6, and as detailed above. The resultant concept list 140 is subjected to the process of box 142, where concept links are generated, leading to the formation of concept link identifiers (CLIDs). The process of box 142 is in accordance with boxes 112 and 112' and the flow diagrams of FIGS. 7A and 7B, and as detailed above, such that the list of box 144 is generated. The list of box 136 is augmented with the new concept link identifiers CLIDs, for example CLID301, CLID302, CLID303, for the replaced pronoun "who", and CLID401, CLID402, CLID403, CLID404, for the replaced pronoun "he".

The concept link identifiers (CLIDs) of the list 144 are then grouped to form a statement, at box 146. An exemplary statement formed from the list 144 is: {[CLID200] [CLID201] [CLID202] [CLID203] [CLID205] [CLID207] [CLID208] [CLID209] [CLID210] [CLID214] [CLID215] [CLID216] [CLID301] [CLID302] [CLID303] [CLID401] [CLID402] [CLID403] [CLID404]}, of box 146.

This statement of box 146, during the answer acquisition process, detailed below, has its weight calculated based on the value of weights for one or more of its constituent concept link identifiers (CLIDs). Initially, the default value or weight of "1" is assigned to all concept link identifiers (CLIDs) that were not created by the pronoun handling process. Accordingly, CLID200, CLID201, CLID202, CLID203, CLID205, CLID207, CLID208, CLID209, CLID210, CLID214, CLID215, and CLID216, may receive the value of "1", the default value for a concept link identifier (CLID), during the answer acquisition process. For concept link identifiers (CLIDs) created as a result of pronoun replacement, their values depend, for example, on distance from the replaced pronoun, in the sentence, as represented by "d" above and shown in FIGS. 10A-10C. Accordingly, CLID301 has a value of 1, CLID302 has a value of 0.5, and CLID303 has a value of 0.33. Similarly, CLID401 has a value of 1, CLID402 has a value of 0.5, CLID403 has a value of 0.33, and CLID404 has a value of 0.25. The application of these values is detailed below, with respect to answer acquisition for pronoun handling.

As can be seen, a process has been developed for pronoun handling, which is used as part of a natural language search engine. This process further builds the structured representation (SR) 42*a* by creating additional data from the corpus of data brought into the data store 42. In order for the search engine to produce "better" or more precise results, the pronouns must be replaced with one or more equivalent nouns. By performing such a process, a search that provides a "better" or more precise result or results, can be conducted in response to an entered query. A variety of algorithms or formulae may be used to replace the assigning of values based on noun proximity (as detailed above), that is presently preferred. Importantly, pronouns are replaced and concept identifiers and concept link identifiers are assigned so that the system described herein can perform the necessary steps to conduct a search.

Figure 11:
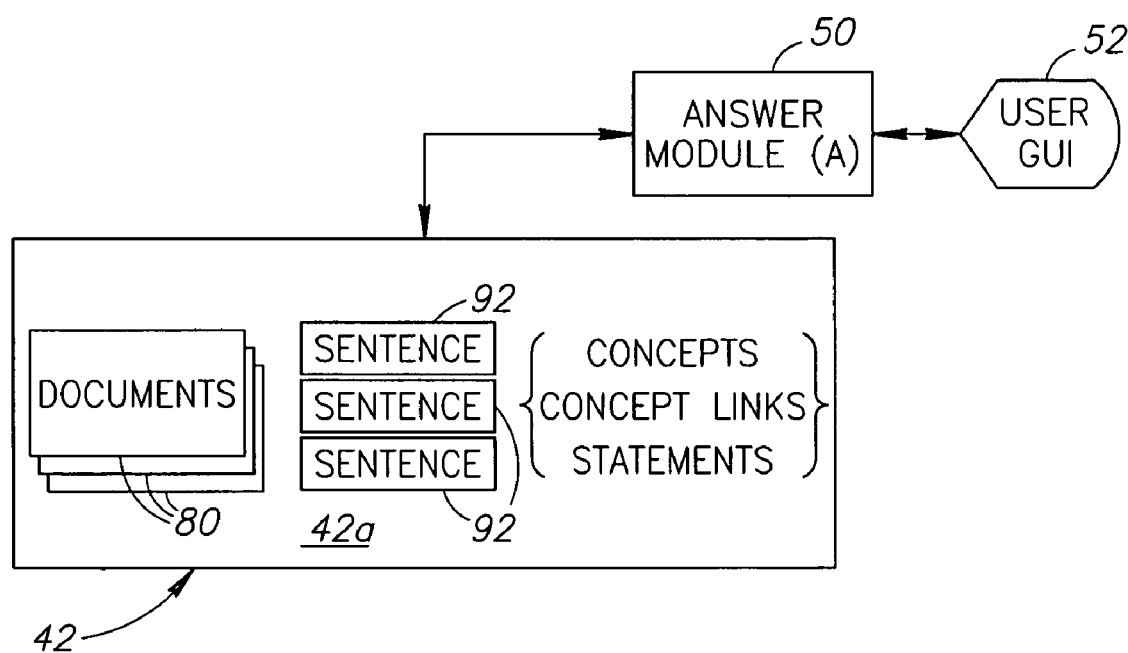
FIG. 11 is a schematic diagram of the architecture for the operation of the answer module of the architecture of FIG. 2.
Figure 12A:
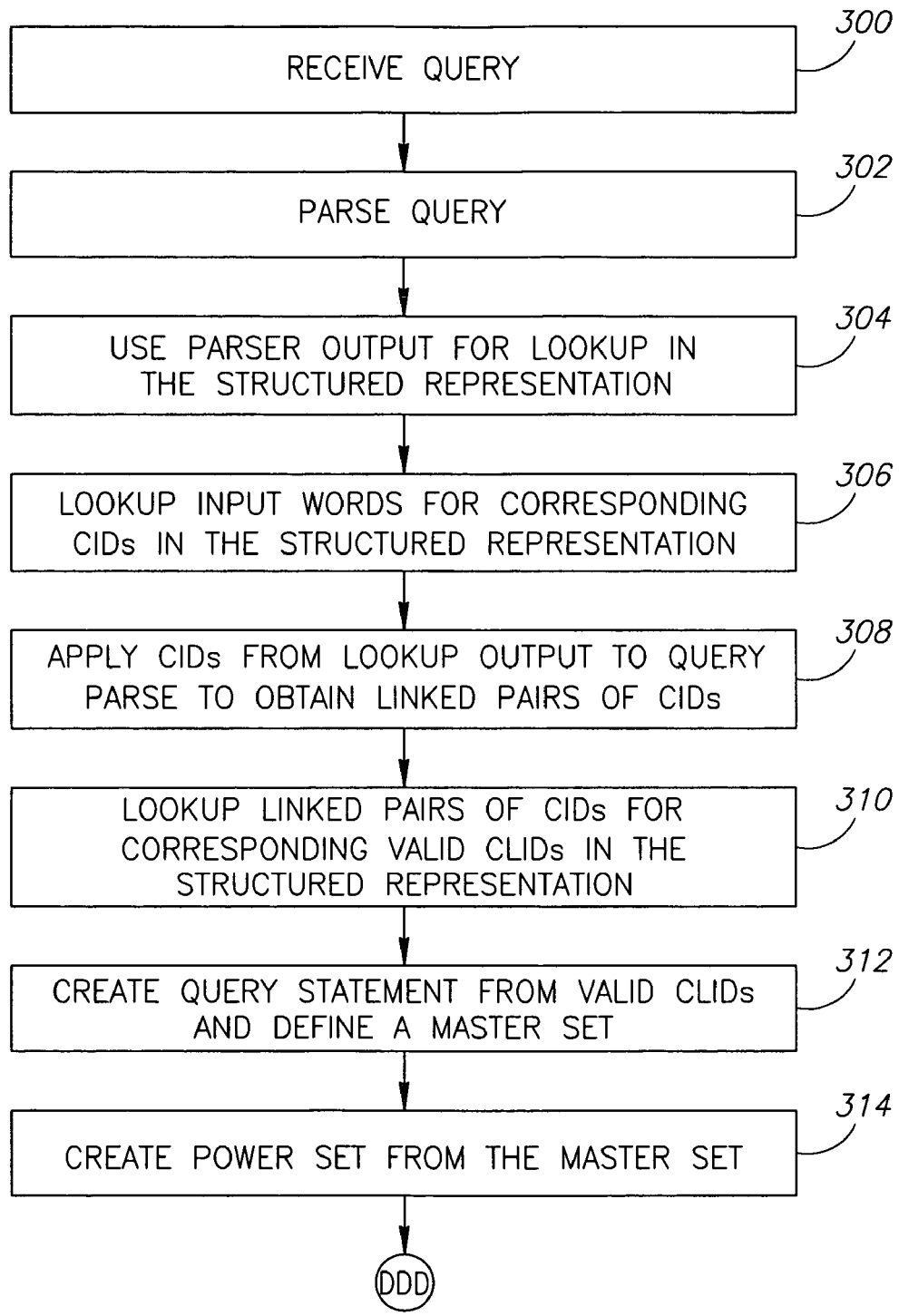
FIGS. 12A and 12B form a flow diagram of a process performed by the answer module in accordance with the present invention.
Figure 12B:
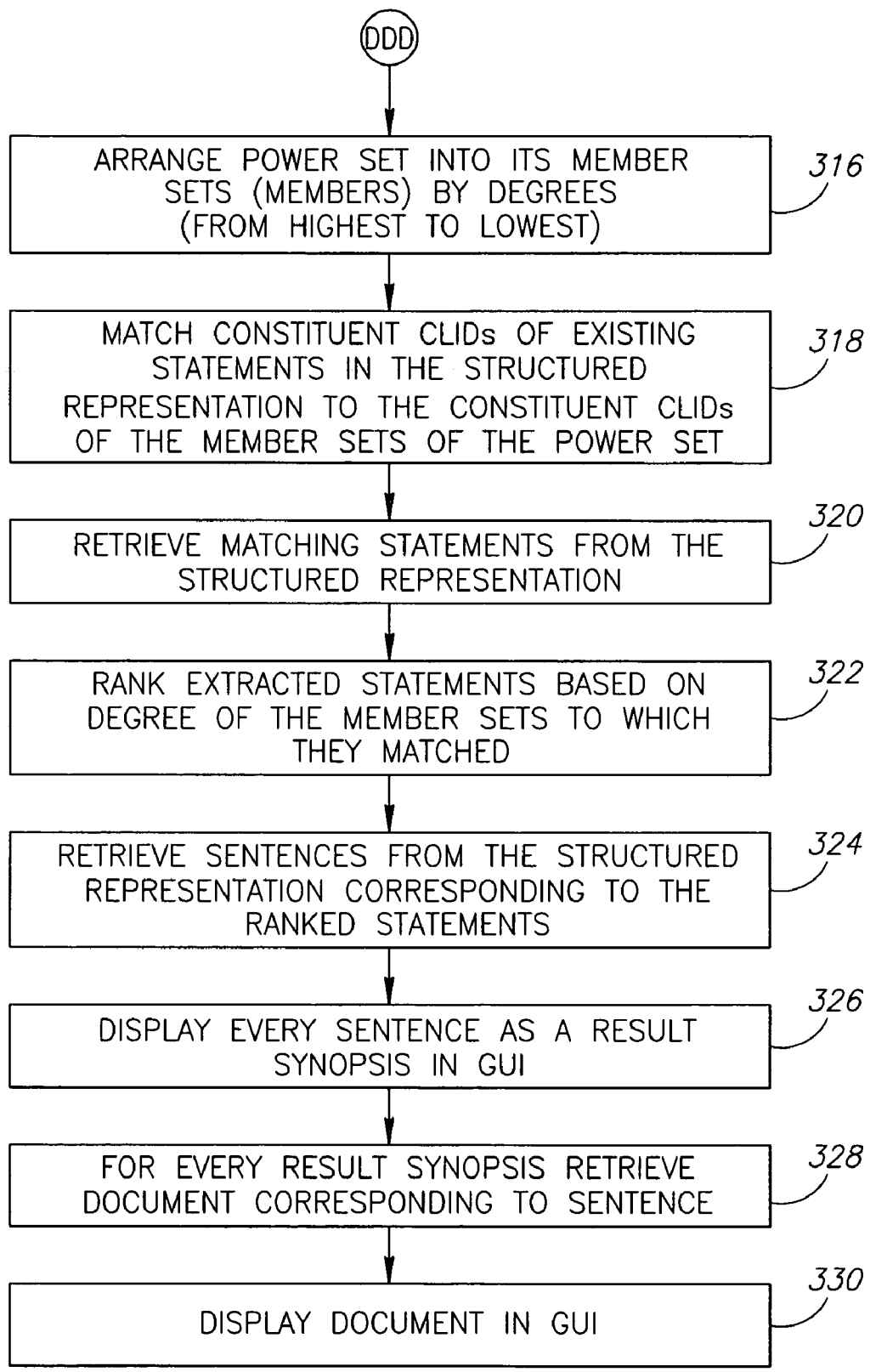

Attention is now directed to FIG. 11, an operational schematic diagram of the answer side of the architecture 40. The answer module (A) 50, takes a query submitted by a user, through an interface, such as a GUI 52. The answer module (A) 50 processes the query and extracts the important linguistic structures from it. In performing the processing, the answer module (A) 50 creates relational components of the query, that are based on the relationships of the words to each other in natural language, in the query. Within the answer module (A) 50 is a parser, for example, the above described LGP.

The parser, for example, the LGP, extracts linguistic structures from the query, and outputs the query, similar to that detailed above, for the database population side. The answer module (A) 50 then requests from the data store 42, sentences and their associated documents, that contain the linguistic structures just extracted. These extracted linguistic structures, encompass answers, that are then ranked in accordance with processes detailed below. Finally, the answer module (A) 50 sends the answers to the GUI 52 associated with the user who submitted the query, for its presentation to the user, typically on the monitor or other device (PDA, iPAQ, cellular telephone, or the like), associated with the user.

Turning also to FIGS. 12A, 12B and 13A-13C, an exemplary process, also known as an answer acquisition process or answer acquisition, is performed by the answer module (A) 50 in the server 20 (and associated architecture 40) is now detailed. Initially, the data store 42, and its structured representation (SR) 42*a*, has been populated with data, for example, statements, concepts and concept links concepts, as detailed above, and for purposes of explanation, such as that shown in FIGS. 5A-8 and detailed above.

The answer module (A) 50 receives a query, entered by a user or the like, in natural language, through an interface, such as the GUI 52, at block 300. An exemplary query may be, "What is the current security level?"

The answer module (A) 50 utilizes the LGP to parse the query at block 302. The output of parsing by the LGP is in accordance with the parsing detailed above, and is shown for example, in FIG. 13A. An exemplary parse of the question would yield the words "what", "is", "the", "current", "security" and "level", including concept senses and links between the words, as shown in the Table of FIG. 13B.

Figures 13A, 13B, 13C:
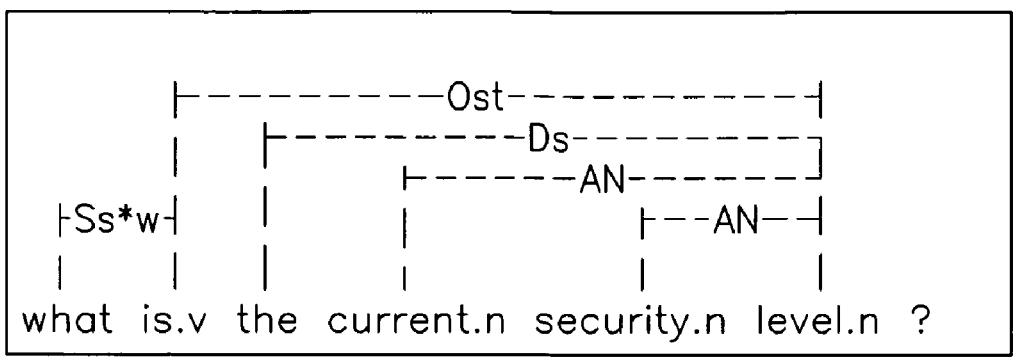
FIGS. 13A-13C are tables illustrating results of sub processes of FIGS. 12A and 12B.
Figure 14A:
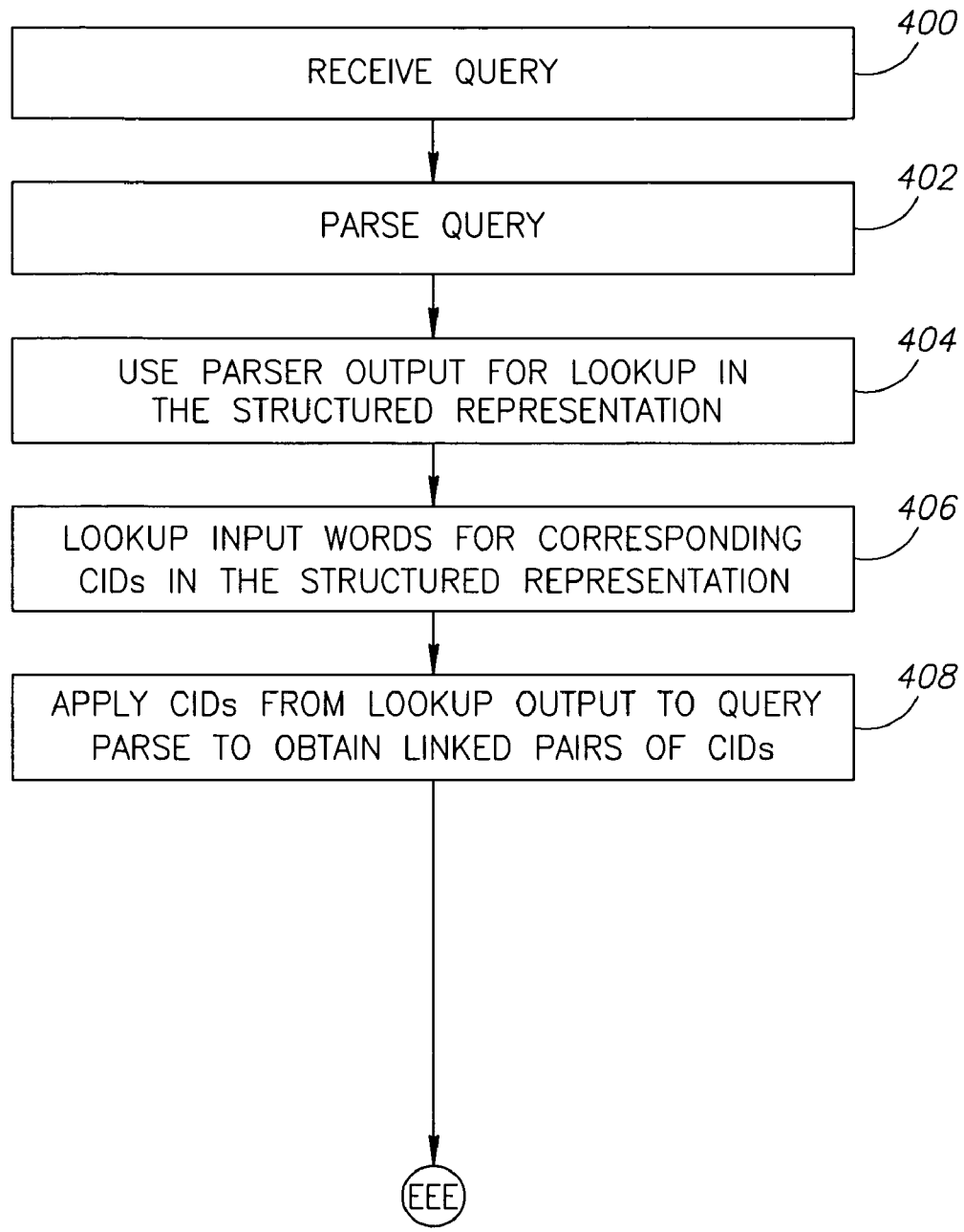
FIGS. 14A-14D are a flow diagram of an additional process performed by the answer module in accordance with the present invention.
Figure 14B:
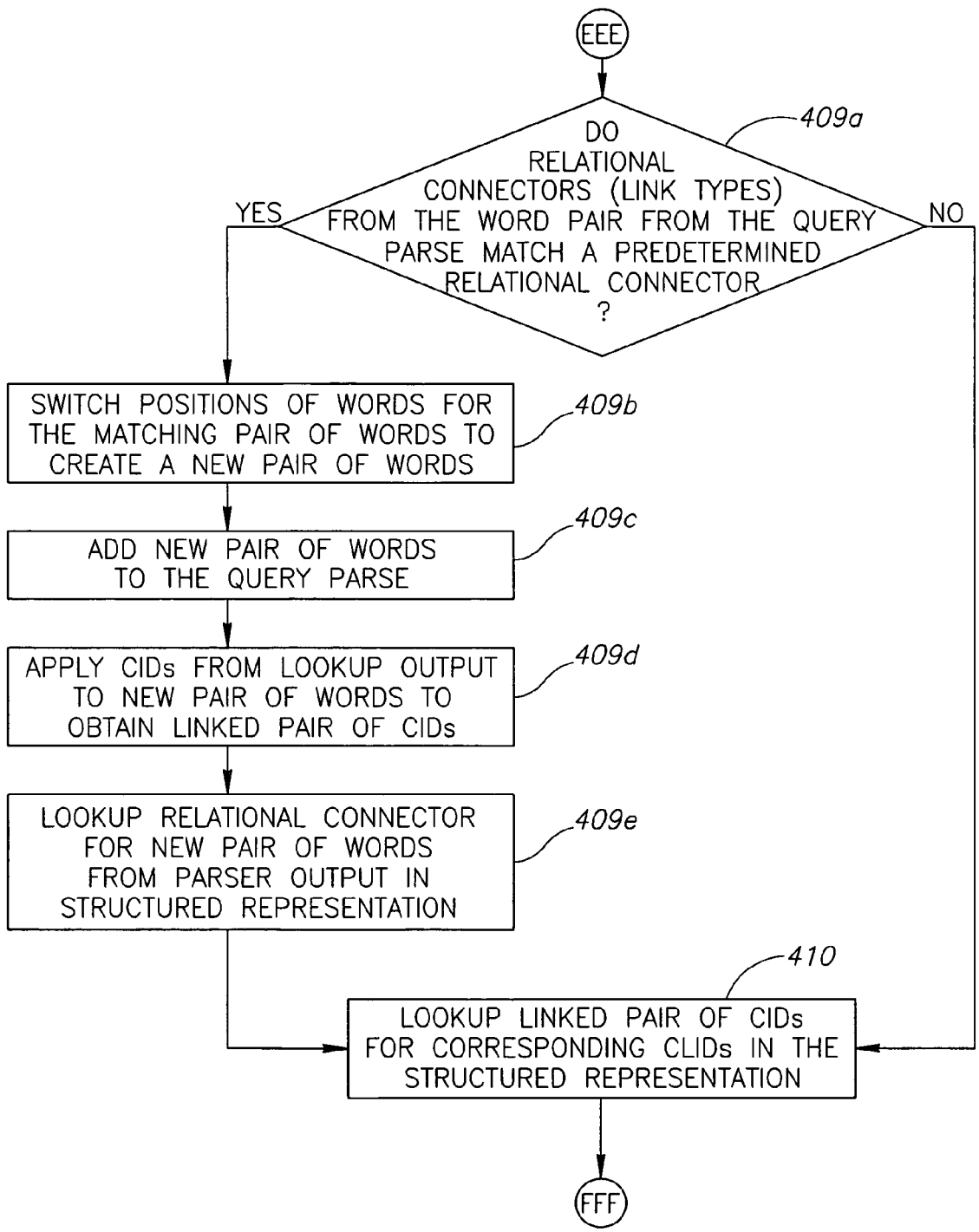
Figure 14C:
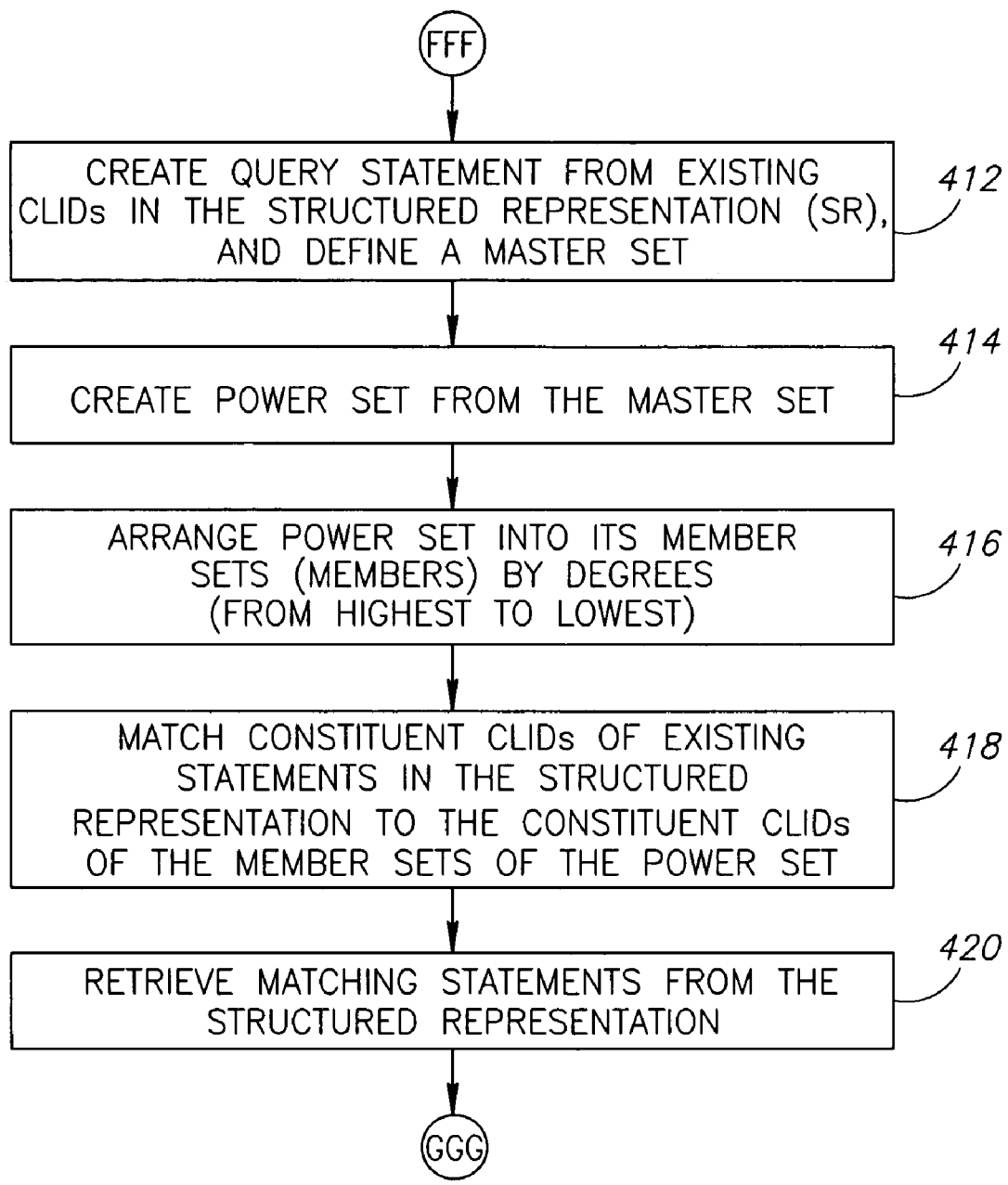
Figure 14D:
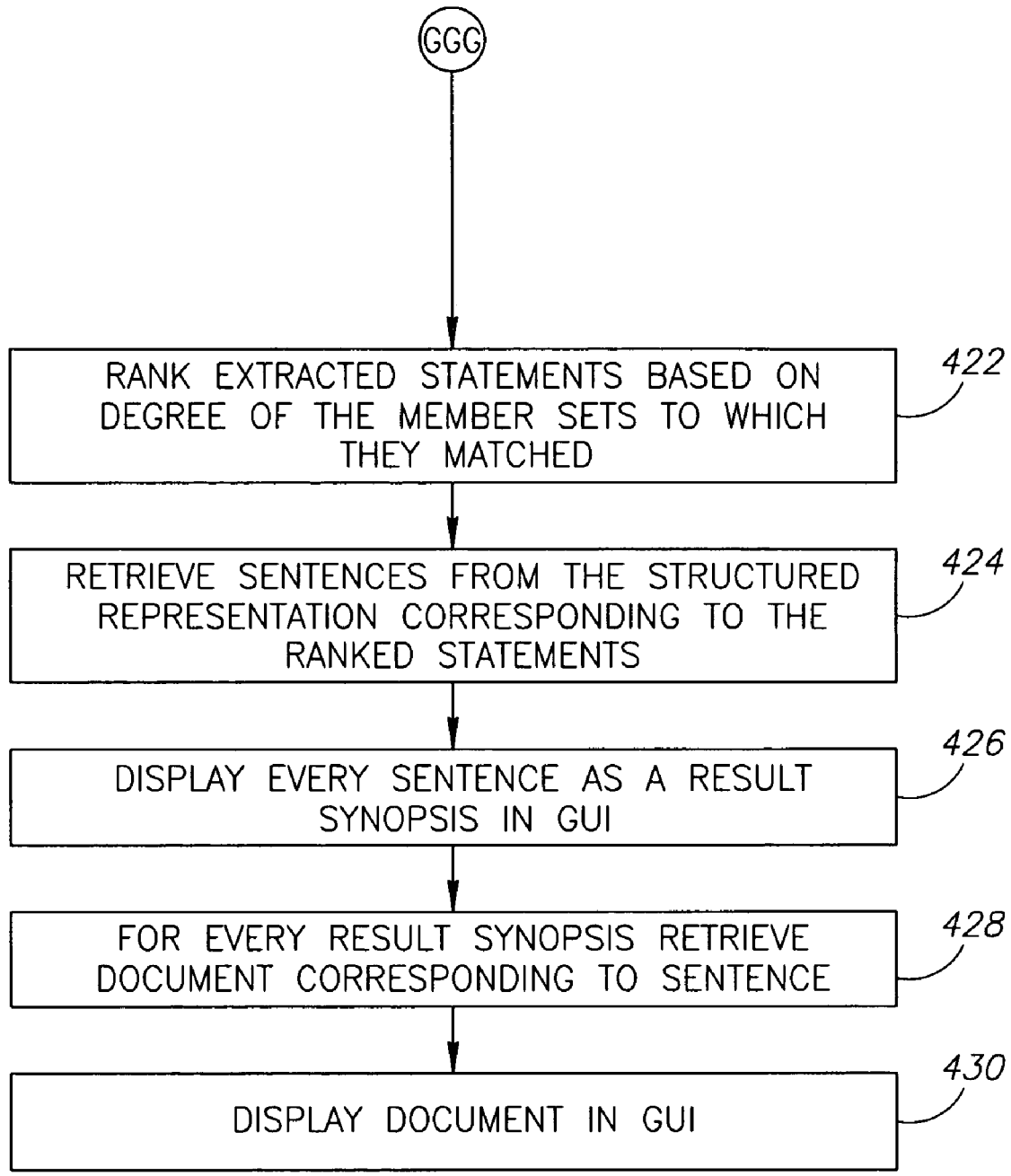

The parser output, for example, as per the Table of FIG. 13B, is used for lookup in the structured representation (SR) 42*a* of the data store 42, for concept identifiers, at block 304. Also in block 304, words of the output are matched with previously determined concept identifiers of the structured representation (SR) 42*a*. In block 306, the words and their concept senses that form the list (or portions of words and their labels) are assigned concept identifiers (CIDs), in accordance with the concept identifiers (CIDs) that have been used to populate the structured representation (SR) 42*a* of the data store 42. However, if an inputted word of the query does not have an existing corresponding concept identifier, a concept identifier is not returned, and if part of a linked pair, the pair will not receive a concept link identifier (CLID).

The inputted words, having been assigned concept identifiers (CIDs), are linked in pairs, as per the query parse (FIGS. 13A and 13B), at block 308. For example, the former word and now concept "is" receives CID5. Similarly, "the" receives CID1, "current" receives CID3, "security" receives CID4 and "level" receives CID2.

The linked pairs of concept identifiers are then subject to lookup for corresponding valid concept link identifiers (CLIDS) in the structured representation (SR) 42*a* of the data store 42, at block 310. For example, this sub process would yield the valid concept link identifiers CLID9, CLID1, CLID2 and CLID3, from the table of FIG. 13C. For example, CLID8 was designated invalid upon populating the data store 42, for example, at box 116 of FIGS. 5A and 5B. (For example, CLID8 and CLID9 were also in the structured representation (SR) 42*a*, previously stored in the data store 42).

A query statement from the valid concept link identifiers is created at block 312. Throughout this document (as indicated above), a query statement is a set of concept links (concept link identifiers) that correspond to the parse of the query. For example, the query statement from the concept link identifiers is as follows: [CLID9] [CLID1] [CLID2] [CLID3]. The statement represents syntactic relationships between the words in the query, and in particular, a collection of syntactic relationships between the words.

All of the valid concept link identifiers (CLIDs) from the query statement, define a master set, expressed as {[CLID9], [CLID1], [CLID2], [CLID3]}, also at block 312. A power set is created from the master set, at block 314. The "power set", as used herein (as indicated above) is written as the function P(S), representative of the set of all subsets of "S", where "S" is the master set. Accordingly, if the query statement includes four concept link identifiers (CLIDs), the size of "S" is 4 and the size of the power set of "S" (i.e., P(S)) is $2^4$ or 16.

At block 316, the power set from the master set (from the query statement): {[CLID9], [CLID1], [CLID2], [CLID3]}, is as follows:

{{[CLID9], [CLID1], [CLID2], [CLID3]}, {[CLID9], [CLID1], [CLID2]}, {[CLID9], [CLID1], [CLID3]}, {[CLID9], [CLID2], [CLID3]}, {[CLID1], [CLID2], [CLID3]}, {[CLID9], [CLID1]}, {[CLID9], [CLID2]}, {[CLID9], [CLID3]}, {[CLID1], [CLID2]}, {[CLID1], [CLID3]}, {[CLID2], [CLID3]}, {[CLID9]}, {[CLID1]}, {[CLID2]}, {[CLID3]}, { }}.

Also in block 316, the members (individual sets) of the power set are arranged in order of their degree. Throughout this document (as indicated above), "degree" or "degrees" refer(s) to the number of concept links in a set. The members of the power set are typically ranked by degree in this manner. In this case, for a query statement with four concept link identifiers (CLIDs), degree 4 is the highest rank, as it includes four concept link identifiers (CLIDs) in this particular collection. Similarly, degree 1 is the lowest, as it includes one concept link identifier (CLID) per collection. While the empty set, of degree zero, is a member of the power set, it is typically not used when arranging the power set.

The power set consists of subsets of the master set, that are ordered by degree and ranked in accordance with the following table:

| | |
|---|---|
| Degree 4 | {[CLID9], [CLID1], [CLID2], [CLID3]} |
| Degree 3 | {[CLID9], [CLID1], [CLID2]}, {[CLID9], [CLID1], [CLID3]}, {[CLID9], [CLID2], [CLID3]}, {[CLID1], [CLID2], [CLID3]} |
| Degree 2 | {[CLID9], [CLID1]}, {[CLID9], [CLID2]}, {[CLID9], [CLID3]}, {[CLID1], [CLID2]}, {[CLID1], [CLID3]}, {[CLID2], [CLID3]} |
| Degree 1 | {[CLID9]}, {[CLID1]}, {[CLID2]}, {[CLID3]} |

The members in the power set are now matched against the statements in the structured representation (SR) 42a, by comparing their concept link identifiers (CLIDs), at block 318. The comparison starts with analysis of the highest (degree 4) member, and goes in descending sequential order, to the lowest (degree 1) member. The answer module (A) 50 performs a comparator function that compares concept link identifiers (CLIDs) in the statements to the concept link identifiers (CLIDs) of the members of the power set, and a matching function, determining if there is a match between the all of the concept link identifiers (CLIDs) of any of the members of the power set, and one or more concept link identifiers (CLIDs) in the statements of the structured representation (SR) 42a. If a statement (from the structured representation (SR) 42a) contains all of the concept link identifiers (CLIDs), that are also contained in a member of the power set, there is a "match", and the statement is not examined or used again. A statement matching a set of degree 4 will be a statement with four matching concept link identifiers, although the statement may include more than four concept link identifiers (CLIDs). Similarly, a statement matching a set of degree 3, degree 2 or degree 1, would be determined in the same manner.

The matching statements are retrieved or pulled from the structured representation (SR) 42a by the answer module (A) 50, at block 320. The retrieved statements are assigned a rank based on the degree of the ordered set that they match, at block 322.

Typically, the statement of the highest degree will be listed as the highest result. The statement of the next highest degree will be considered as the next highest result. Listings may be for as many results as desired. Alternately, if there are not any matches, a result may not be returned.

Sentences, corresponding to the retrieved statements, are retrieved from the structured representation (SR) 42a, at block 324. At block 326, each retrieved sentence is displayed on the GUI 52 as a result synopsis. A document is retrieved for every result synopsis selected by the user or the like, from which the sentence is a part of, at block 328. The document is ultimately displayed in the GUI 52, at block 330. A hypertext link for the document may also appear on the GUI 52.

Alternately, if there are not any matches, a result may not be returned.

In an additional embodiment of an answer acquisition process or answer acquisition, shown in the Flow Diagram of FIGS. 14A-14D, the answer module 50 (A) receives a query, entered by a user or the like, in natural language, through an interface, such as the GUI 52, at block 400. An exemplary query may be, "Who is the U.S. president?"

The answer module (A) 50 utilizes the LGP to parse the query at block 402. The output of parsing by the LGP is in accordance with the parsing detailed above, and is shown, for example, in FIG. 15A. An exemplary parse of the question would yield the words "who", "is", "the", "U.S." and "president", including concept senses and relational connectors, also known as link types, between the words, as paired by the parse, indicative of the relationship between two words of the parse. The output of the parse of FIG. 15A is shown as a Table of FIG. 15B.

Figures 15A, 15B, 15C, 15D, 15E:
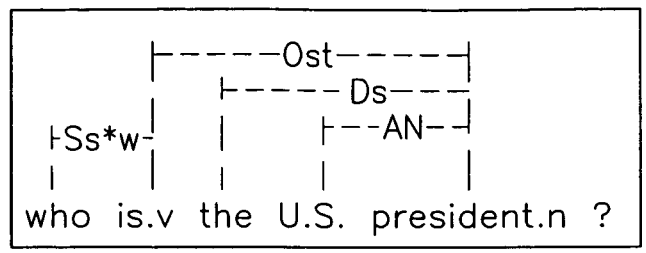
FIGS. 15A-15E are tables illustrating results of sub processes of FIGS. 14A-14D; and, FIG. 16 is a diagram of the data structure for the system of the invention.

The parser output, for example, as per the Table of FIG. 15B, is used for lookup in the structured representation (SR) 42a of the data store 42, for concept identifiers (CIDs), at block 404. Also in block 404, words of the output are matched with previously determined concept identifiers (CIDs) of the structured representation (SR) 42a. In block 406, the words and their concept senses that form the list (or portions of words and their labels) are assigned concept identifiers (CIDs), in accordance with the concept identifiers (CIDs) that have been used to populate the structured representation (SR) 42a of the data store 42.

However, if an inputted word of the query does not have an existing corresponding concept identifier (CID), a concept identifier is not returned, and if part of a linked pair of concept identifiers (CIDs) (formed from word pairs as determined by the parse), the pair will not receive a concept link identifier (CLID). If a concept link identifier (CLID) is not assigned to the word pair, this word pair will not be used in forming the query statement, as detailed below.

The inputted words, having been assigned concept identifiers (CIDs) (here, for example, this includes all words of the query parse), are linked in pairs. The linking is by relational connectors or link types, as per the query parse (FIGS. 15A and 15B), at block 408.

In order to receive a more complete response or answer to the query, it is desired to augment data derived from the query, to create additional word pairs. The additional word pairs, that are created, allow for additional data to be obtained from the structured representation (SR) 42a. Augmenting the data from the query occurs, as the process now moves to blocks 409a-409e, where, if certain relational connectors (link types) appear in the parse, as associated with any particular parsed pair of words, the positions of the words of that pair will be reordered (switched or flipped). The relational connectors (link types), that will result in a word pair from the parse being reordered (switched or flipped), are typically set by the system administrator, and programmed into the server 20 (FIG. 1).

At block 409a, it is determined if the relational connectors (link types) from each word pair of the query parse match a predetermined relational connector. For example, the predetermined relational connectors (link types) may be the following: Ost, Sis, Sip, SIpx, Pa, all of these relational connectors (link types) defined in Appendix C herein. Alternately, any other collection, group, list, or the like, of relational connectors may define the predetermined relational connectors (link types).

If there is a match of relational connectors (link types), between a relational connector (link type) of a word pair and a predetermined relational connector (link type) (as programmed into the server 20), at block 409a, the word pair (paired concept identifiers (CIDs) corresponding thereto), is isolated. Otherwise, the process moves to block 410.

With the detection of one or more matches of relational connectors (link types) at block 409a, the word pair or word pairs, the concept senses associated with each word, and the relational connector (link type) associated with the word pair, are isolated, as shown in the broken line box of FIG. 15C. In FIG. 15C, for example, the relational connector "Ost" for the word pair "is.v" "president.n" is a match with the predetermined "Ost" relational connector. The broken line box in FIG. 15C is for emphasis only.

The isolated word pair (based on matching relational connectors), for example, as shown in the broken line box if FIG. 15C, is reordered (switched or flipped). This reordering (switching or flipping) results in the positions of the words being exchanged (reversed, as a pair of words is being used here) from their initial positions in the query parse (FIGS. 15A and 15B), to new positions, creating a "new" pair of words, in block 409b.

The reordered (switched or "flipped") word pair, also known as the "new" pair, is added to the Table or listing of the query parse, as shown, for example, in the broken line box of in the Table of FIG. 15D, at block 409c. The broken line box in FIG. 15D is for emphasis only. A relational connector (link type) is initially not associated with this new word pair.

With this new word pair added to the listing of the query parse, concept identifiers (CIDs) are assigned to the word pair, by looking up output in the structured representation, at block 409d. Additionally, the structured representation (SR) 42(a) is searched for a relational connector (link type) for the new word (now new concept) pair, at block 409e.

With concept identifiers (CIDs) and a relational connector (link type) assigned to each new word pair, the process moves to block 410, where the linked pairs of concept identifiers (CIDs) are then subject to lookup for corresponding concept link identifiers (CLIDs), that exist in the structured representation (SR) 42a of the data store 42. With concept link identifiers (CLIDS) that exist in the structured representation (SR) 42a, assigned to the paired concept identifiers (CIDs), including the paired concept identifiers corresponding to the new or "flipped" pair of words, the table of FIG. 15E is generated.

This Table includes the generated concept link identifiers (CLIDs), CLID1, CLID2, CLID3, CLID4, developed from the query parse, plus the concept link identifier (CLID), CLID5, associated with the reordered (switched or flipped) or new word pair, developed at blocks 409a-409e. Each concept link identifier (CLID) is associated with a number, that is indicated next to each respective concept link identifier (CLID) (the rightmost column in FIG. 15E). The number represents a value, assigned to each Concept Link Identifier (CLID), based on the relative positions of the words in the query, from which the CLID was formed. For example, CLID1 has a value of 3, CLID2 has a value of 7, CLID3 has a value of 8, CLID4 has a value of 9, and CLID5 has a value of 8.

These values are used to order members of the power set of the same degree, as detailed below. For example, and as detailed further below, {[CLID3], [CLID4]} outranks {[CLID1], [CLID2]}, as 8+9>3+7, even though these members of the power set are of the same degree (Degree 2). As a result, as detailed below, answers are first checked for the higher ranked member, {[CLID3], [CLID4]}, before checking for answers for the lower ranked member, {[CLID1], [CLID2]}.

Additionally, in the table of FIG. 15E, for example, the reordered (switched or flipped) or "new" word pair has been assigned the relational connector (concept link) "Ss". This relational connector (Ss) is stored in the structured representation (SR) 42a, from the output parse of the LGP, for the concept identifiers corresponding to the word pair (with concept senses associated with the respective word in the pair) "president.n." "is.v".

In this embodiment, validity of the concept links is typically not taken into account. However, the validity of the concept links may be analyzed, as detailed above. Accordingly, the five concept link identifiers, formed of CLID1-CLID4, plus CLID5, for the reordered (switched or "flipped") link, exist for the Master Set. The process moves to block 412.

A query statement from the existing concept link identifiers (as all concept link identifiers are valid concept link identifiers) in the structured representation (SR) 42a, is created at block 412. Accordingly, if a concept link identifier (CLID) does not exist in the structured representation (SR) 42a, for any pair of concept identifiers (CID), corresponding to a word pair, or a concept identifier (CID) did not exist in the structured representation (SR) 42a for one or both of the words in a word pair, the pair of concept identifiers or word pair, is not kept. Only the word pairs that result in concept link identifiers (CLIDs), that exist in the structured representation (SR) 42a, will form the query statement, and ultimately the master set of concept link identifiers (CLIDs).

For example, the query statement from the concept link identifiers is as follows: [CLID1] [CLID2] [CLID3] [CLID4] [CLID5]. The statement represents syntactic relationships between the words in the query, and in particular, a collection of syntactic relationships between the words.

All of the concept link identifiers (CLIDs) from the query statement, define a master set, expressed as {[CLID1], [CLID2], [CLID3], [CLID4], [CLID5]}, also at block 412. A is created from the master set, at block 414. The "power set", as used herein (as indicated above) is written as the function P(S), representative of the set of all subsets of "S", where "S" is the master set. Accordingly, if the query statement includes five concept link identifiers (CLIDs), the size of "S" is 5 and the size of the power set of "S" (i.e., P(S)) is $2^5$ or 32.

At block 416, the power set from the master set (from the query statement): {[CLID1], [CLID2], [CLID3], [CLID4], [CLID5]}, is as follows:

{{[CLID1], [CLID2], [CLID3], [CLID4], [CLID5]}, {[CLID1], [CLID2][CLID3], [CLID4]}, {[CLID1], [CLID2], [CLID3], [CLID5]}, {[CLID1], [CLID2], [CLID4], [CLID5]}, {[CLID1], [CLID3], [CLID4], [CLID5]}, {[CLID2], [CLID3], [CLID4], [CLID5]}, {[CLID1], [CLID2], [CLID3]}, {[CLID1], [CLID2], [CLID4]}, {[CLID1], [CLID2], [CLID5]}, {[CLID1], [CLID3], [CLID4]}, {[CLID1], [CLID3], [CLID5]}, {[CLID1], [CLID4], [CLID5]}, {[CLID2], [CLID3], [CLID4]}, {[CLID2], [CLID3], [CLID5]}, {[CLID2], [CLID4], [CLID5]}, {[CLID3], [CLID4], [CLID5]}, {[CLID1], [CLID2]}, {[CLID1], [CLID3]}, {[CLID1], [CLID4]}, {[CLID1], [CLID5]}, {[CLID2], [CLID3]}, {[CLID2], [CLID4]}, {[CLID2], [CLID5]}, {[CLID3], [CLID4]}{[CLID3], [CLID5]}, {[CLID4], [CLID5]},{[CLID1]}, {[CLID2]}, {[CLID3]}, {[CLID4]}, {[CLID5]}, { }}.

Also in block 416, the members (individual sets) of the power set are arranged in order of their degree. Throughout this document (as indicated above), "degree" or "degrees" refer(s) to the number of concept links in a set. The members of the power set are typically ranked by degree in this manner. In this case, for a query statement with four concept link identifiers (CLIDs), degree 5 is the highest rank, as it includes four concept link identifiers (CLIDs) in this particular collection. Similarly, degree 1 is the lowest, as it includes one concept link identifier (CLID) per collection. While the empty set, of degree zero, is a member of the power set, it is typically not used when arranging the power set.

The power set consists of subsets of the master set, that are ordered by degree, and within the degree, ordered by weight, for example concept link counts (the numerals in the rightmost column of FIG. 13E, with CLID1 having a weight of 3, CLID2 having a weight of 7, CLID3 having a weight of 8, CLID4 having a weight of 9 and CLID5 having a weight of 8). The subsets are ranked by degree and weighted within each degree, in accordance with the following table:

| | |
|---|---|
| Degree 5 | {[CLID1], [CLID2], [CLID3], [CLID4], [CLID5]} |
| Degree 4 | {[CLID2], [CLID3], [CLID4], [CLID5]}, {[CLID1], [CLID3], [CLID4], [CLID5]}, {[CLID1], [CLID2], [CLID4], [CLID5]}, {[CLID1], [CLID2], [CLID3], [CLID4]}, {[CLID1], [CLID2], [CLID3], [CLID5]} |
| Degree 3 | {[CLID3], [CLID4], [CLID5]}, {[CLID2], [CLID4], [CLID5]}, {[CLID2], [CLID3], [CLID4]}, {[CLID2], [CLID3], [CLID4], [CLID5]}, {[CLID1], [CLID3], [CLID4], [CLID5]}, {[CLID1], [CLID3], [CLID4]}, {[CLID1], [CLID3], [CLID5]}, {[CLID1], [CLID2], [CLID4]}, {[CLID1], [CLID2], [CLID5]}, {[CLID1], [CLID2], [CLID3]} |
| Degree 2 | {[CLID4], [CLID5]}, {[CLID3], [CLID4]}, {[CLID3], [CLID5]}, {[CLID2], [CLID4]}, {[CLID2], [CLID5]}, {[CLID2], [CLID3]}, {[CLID1], [CLID4]}, {[CLID1], [CLID5]}, {[CLID1], [CLID3]}, {[CLID1], [CLID2]} |
| Degree 1 | {[CLID4]}, {[CLID5]}, {[CLID3]}, {[CLID2]}, {[CLID1]} |

The members in the power set are now matched against the statements in the structured representation (SR) 42*a*, by comparing their concept link identifiers (CLIDs), at block 418. The comparison starts with analysis of the highest (degree 5) member, and goes in descending sequential order, to the lowest (degree 1) member. The answer module (A) 50 performs a comparator function that compares concept link identifiers (CLIDs) in the statements to the concept link identifiers (CLIDs) of the members of the power set, and a matching function, determining if there is a match between the all of the concept link identifiers (CLIDs) of any of the members of the power set, and one or more concept link identifiers (CLIDs) in the statements of the structured representation (SR) 42*a*. If a statement (from the structured representation (SR) 42*a*) contains all of the concept link identifiers (CLIDs), that are also contained in a member of the power set, there is a "match", and the statement is not examined or used again. A statement matching a set of degree 5 will be a statement with five matching concept link identifiers, although the statement may include more than five concept link identifiers (CLIDs). Similarly, a statement matching a set of degree 4, degree 3, degree 2 or degree 1, would be determined in the same manner.

The matching statements are retrieved or pulled from the structured representation (SR) 42*a* by the answer module (A) 50, at block 420. The retrieved statements are assigned a rank based on the degree of the ordered set that they match, at block 422.

Typically, the statement of the highest degree will be listed as the highest result. The statement of the next highest degree will be considered as the next highest result.

Listings may be for as many results as desired. Alternately, if there are not any matches, a result may not be returned.

Sentences, corresponding to the retrieved statements, are retrieved from the structured representation (SR) 42*a*, at block 424. At block 426, each retrieved sentence is displayed on the GUI 52 as a result synopsis. A document is retrieved for every result synopsis selected by the user or the like, from which the sentence is a part of, at block 428. The document is ultimately displayed in the GUI 52, at block 430. A hypertext link for the document may also appear on the GUI 52.

Alternately, when the process of pronoun handling (pronoun replacement), as detailed above, is employed in populating the structured representation (SR) 42*a*, an alternate process for answer acquisition may be employed. In this alternate answer acquisition process, the inputted query is parsed and converted to data as detailed above. The data from the query is compared to data, typically in the form of statements, in a data base (i.e., the structured representation (SR) 42*a*), to determine matches. This includes comparing the query data to statements, whose pronouns have been substituted with nouns. When providing a response to the query, both substituted and non-substituted statements, that matched the query data, are analyzed, to determine the best or most precise response.

Answer acquisition begins as the query is parsed, with the parse resulting in the creation of a power set, having members that are arranged by degree, in accordance with any of the processes of blocks 300-316 of FIGS. 12A-12D, or blocks 400-416 of FIGS. 14A-14D, detailed above. Statements from the structured representation (SR) 42*a* are compared against the members of the power set for matching concept link identifiers (CLIDs), in accordance with the processes of blocks 318 and 418, as detailed above. The statements having matching concept link identifiers (CLIDs) are retrieved or pulled from the structured representation (SR) 42*a* by the answer module (A) 50, in a process similar to that described in blocks 320 and 420 above.

The matching concept link identifiers (CLIDs), in each statement from the structured representation (SR) 42*a*, are assigned weight values, and the sum of these weight values is the total weight value for the individual statement. The statement with the greatest total weight value, regardless of its degree, as per the arrangement of the power set, is considered to be the top result. This result will yield the best or most precise response to the query.

For example, a stored statement from the structured representation (SR) 42a has six concept link identifiers—[CLIDa], [CLIDb], [CLIDc], [CLIDd], [CLIDe], [CLIDf]. Concept link identifiers [CLIDa], [CLIDb], and [CLIDf], were developed by combining concept identifiers, as detailed above, and accordingly, each receive a standard or preset weight value of "1". Concept link identifiers [CLIDc], [CLIDd], and [CLIDe], were developed by the process of pronoun handling or pronoun replacement, detailed above, and accordingly have variable weight values, such that [CLIDc] received a weight value of 1, [CLIDd] received a weight value of 0.5, and [CLIDe] received a weight value of 0.33.

If four concept link identifiers (CLIDs) of the stored statement, for example, [CLIDa], [CLIDd], [CLIDe], and [CLIDf] "matched" the same concept link identifiers (CLIDs) of a member of the power set (a degree 4 member), this stored statement has a total weight value of 2.83. This total weight value is the sum of the weight values for [CLIDa], [CLIDd], [CLIDe], and [CLIDf] or (1+0.5+0.33+1).

These total weight values may be calculated for as many stored statements (from the structured representation (SR) 42a) as desired. Alternately, if there are not any matches, a result may not be returned.

Sentences, corresponding to the retrieved statements having the greatest total weight values, are retrieved from the structured representation (SR) 42a, in processes similar to those of blocks 324 and 424. In processes similar to blocks 326 and 426, each retrieved sentence is displayed on the GUI 52 as a result synopsis. A document is retrieved for every result synopsis selected by the user or the like, from which the sentence is a part of, in processes similar to those of blocks 328 and 428. The document is ultimately displayed in the GUI 52, in processes similar to those for blocks 330 and 430. A hypertext link for the document may also appear on the GUI 52.

Figure 16:
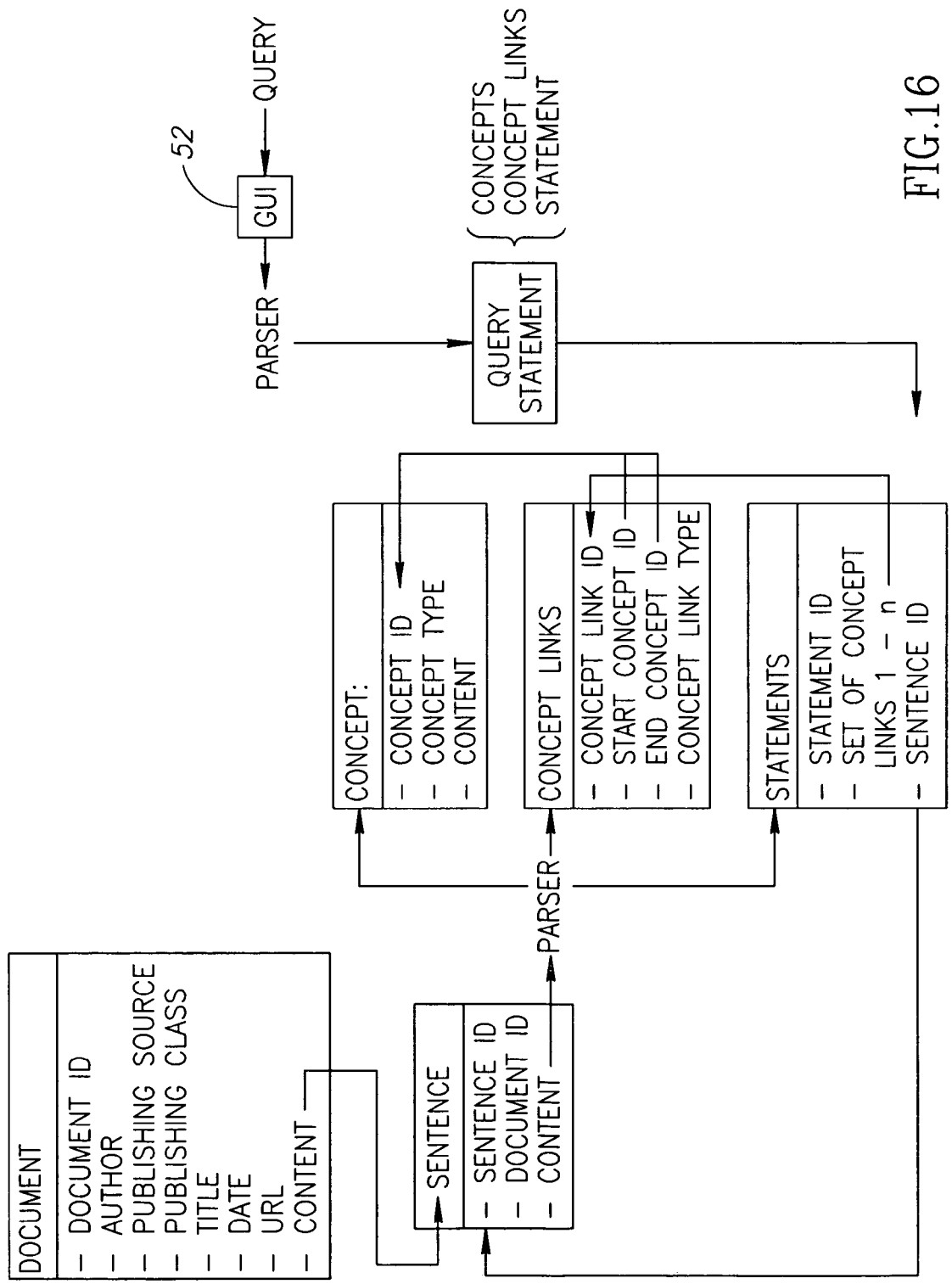

FIG. 16 shows a chart of a statement ultimately leading to sentences and documents, as per blocks 324, 326 and 328, and blocks 424, 426 and 428. Once a statement has been determined to be the result. A lookup is performed on the structured representation (SR) 42a, to retrieve the sentence corresponding to the statement. There is a one to one relation between statements and sentences. The sentences are then used to identify the document from which they came.

The above-described processes including portions thereof can be performed by software, hardware and combinations thereof. These processes and portions thereof can be performed by computers, computer-type devices, workstations, processors, micro-processors, other electronic searching tools and memory and other storage-type devices associated therewith. The processes and portions thereof can also be embodied in programmable storage devices, for example, compact discs (CDs) or other discs including magnetic, optical, etc., readable by a machine or the like, or other computer usable storage media, including magnetic, optical, or semi-conductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

While preferred embodiments of the present invention have been described, so as to enable one of skill in the art to practice the present invention, the preceding description is intended to be exemplary only. It should not be used to limit the scope of the invention, which should be determined by reference to the following claims.

What is claimed is:

1. A method for replacing pronouns in word groups derived from
    predetermined collections of words, comprising:
    isolating at least one pronoun in each word group; and,
    determining at least one noun to replace each of the isolated pronouns, by evaluating and assigning a weight value to each of the nouns with respect to their proximity to each pronoun that has been isolated, in the predetermined collection of words.

2. The method of claim 1, wherein the predetermined collection of words is selected from the group consisting of at least one sentence, at least one phrase, or at least one question.

3. The method of claim 1, wherein each word group includes a pair of words.

4. A method for creating statements for providing at least one response to at least one query comprising:
    creating an array having at least one pronoun;
    parsing a series of words arranged in a predetermined order into a parsed output, the parsed output including a first collection of words;
    comparing the pronoun array with pronouns from the parsed output to identify pronouns;
    replacing each identified pronoun in the first collection of words with a noun corresponding to the matched pronoun to form a second collection of words; and
    assigning concept identifiers, if corresponding concept identifiers exist for each word in at least one database.

5. The method of claim 4, wherein the words in the second collection of words are ordered in groups in accordance with predetermined relationships of the first collection of words.

6. The method of claim 5, wherein the groups include pairs.

7. The method of claim 4, wherein the concept identifiers are paired in accordance with their respective ordered word pairs to form concept link identifiers.

8. The method of claim 7, wherein the concept link identifiers are arranged into statements.

9. The method of claim 4, wherein replacing each matched pronoun in the first collection of words with a noun corresponding to the matched pronoun includes, extracting nouns and pronouns from the parsed output, arranging the extracted nouns and pronouns into an ordered format, and, analyzing the positions of the nouns with respect to the pronoun in the ordered format to evaluate and assign a weight value to the noun for replacing each pronoun in order to form the second collection of words.

10. A method for producing statements from paired words comprising:
    obtaining related groups of words from a first parse of a predetermined collection of words;
    isolating the nouns and pronouns from the first parse into a second parse;
    comparing predetermined pronouns against the nouns and pronouns of the second parse for pronoun matches;
    determining at least one noun for each matched pronoun;
    replacing each matched pronoun with the at least one determined noun in the corresponding related group of words; and
    assigning concept identifier links to the resulting word pairs.

11. The method of claim 10, wherein each related group of words includes a pair of words.

12. The method of claim 10, wherein the predetermined collection of words is selected from the group consisting of at least one sentence, at least one phrase, or at least one question.

13. The method of claim 12, wherein the predetermined collection of words is in natural language.

14. In a search engine architecture, a module for handling pronouns, comprising:
   at least one storage media for storing a list of predetermined pronouns; and,
   a processor programmed to:
      obtain related groups of words from a first parse of a predetermined series of words
      isolate the nouns and pronouns from the first parse into a second parse;
      compare predetermined pronouns from the at least one storage media against the nouns and pronouns of the second parse for pronoun matches;
      determine at least one noun for each matched pronoun; and,
      replace each matched pronoun with the at least one noun in the corresponding related group of words; and
      assign concept identifier links to the resulting word pairs.

15. The module of claim 14, wherein the processor programmed to obtain related groups of words includes being programmed to obtain related pairs of words.

16. The module of claim 15, wherein the predetermined series of words is selected from the group consisting of at least one sentence, at least one phrase, or at least one question.

17. The module of claim 16, wherein the at least one predetermined series of words is in natural language.

18. The module of claim 14, wherein the processor programmed to determine the at least one noun for each pronoun includes analyzing the second parse based on the order of the matched pronoun with respect to at least one noun.

19. A method for providing at least one response to at least one query in natural language, comprising:
   populating a data store by obtaining documents from at least a portion of a corpus;
   isolating sentences from the documents, parsing the sentences into linked pairs of words in accordance with predetermined relationships;
   identifying pronouns in each of the linked pairs of words;
   replacing each of the identified pronouns with at least one corresponding noun;
   assigning concept identifiers to each word of the linked pair of words;
   assigning concept link identifiers to each pair of concept identifiers corresponding to each linked pair of words; and,
   combining valid concept link identifiers for each sentence into a statement.

20. The method of claim 19, additionally comprising:
   receiving an inputted query in natural language;
   parsing the query into linked pairs of words;
   assigning concept identifiers to each word of each linked pair of words;
   assigning concept link identifiers to each pair of concept identifiers corresponding to each linked pair of words; and,
   combining valid concept link identifiers into a query statement.

21. The method of claim 20, additionally comprising:
   analyzing the query statement and the statements in the data store for matches between concept link identifiers;
   isolating statements in the data store having at least one concept link identifier that matches at least one concept link identifier in the query statement; and,
   providing at least one sentence corresponding to at least one isolated statement in the data store as a response to the natural language query.

22. The method of claim 21, additionally comprising: providing access to at least one document from which the at least one sentence, corresponding to the at least one matched statement, was isolated.

23. A computerized method for creating concept links from a set of concept groups derived from data from a corpus at a processor, the processor embodying a program of instructions executable by the processor to perform method steps, the method steps, comprising:
   analyzing the words in word groups corresponding to each of the concept groups, for words that are pronouns;
   replacing each of the pronouns in each of the word groups with nouns corresponding to each of the pronouns; and,
   assigning concept identifier links to the resulting word pairs.

24. The method of claim 23, wherein the concept groups include concept pairs.

25. The method of claim 23, wherein the word groups include word pairs.

26. A system for providing at least one response to a received query, comprising:
   at least one storage media for storing concept identifiers, concept link identifiers, pronouns, and at least one noun corresponding to each of the pronouns, extracted from a corpus, and statements derived from the corpus; and,
   a processor in communication with the at least one storage media, the processor programmed to:
      create related pairs of words from the predetermined series of words from documents of the corpus, each of the related pairs of words including one word at a first position and one word at a second position;
      identify pronouns by matching pronouns in each of the related pairs of words with pronouns in the at least one storage media;
      replace each of the identified pronouns with at least one corresponding noun;
      assign concept identifiers to each word in each pair of words;
      create pairs of concept identifiers by applying the assigned concept identifiers to each word in the related pairs of words;
      assign concept link identifiers to each pair of concept identifiers;
      combine all of the valid concept link identifiers into a statement; and
      store the statement in the at least one storage media.

27. The system of claim 26, wherein the processor is additionally programmed to:
   obtain a plurality of concept link identifiers arranged as a statement from a query entered into the system, the plurality of concept link identifiers defining a query statement;
   arrange all of the concept link identifiers of the query statement into a master set, where N is the number of concept link identifiers in the master set; and,
   create a power set from the master set including, creating a plurality of subsets from the master set, the plurality of subsets defining members of the power set, the power set including at least one member of N concept link identifiers and at least N members of one concept link identifier.

28. The system of claim 27, wherein the processor is additionally programmed to:
analyze at least one statement stored in the at least one storage media with the members of the power set, including, determining matches of the concept link identifiers in the at least one stored statement with all of the concept link identifiers in each member of the power set.

29. The system of claim 28, wherein the processor is additionally programmed to:
isolate the at least one stored statement, if the at least one stored statement has concept link identifiers that match all of the concept link identifiers in a member of the power set.

30. The system of claim 29, wherein the processor is additionally programmed to:
select at least one of the at least one stored statement that has been isolated, to provide at least one response to the query.

31. The system of claim 26, wherein the at least one storage media includes a structured representation of the corpus.

32. The system of claim 26, wherein the predetermined series of words is selected from the group consisting of at least one sentence, at least one phrase, or at least one question.

33. A computerized method for conducting a natural language search at a processor, the processor embodying a program of instructions executable by the processor to perform method steps, the method steps comprising:
detecting pronouns in word groups obtained from a corpus of data, and replacing the pronouns in the word groups with nouns from the corpus of data to form substituted statements;
creating word groups from an inputted query;
isolating word groups from the substituted statements that match at least one word group from the query; and,
providing at least one response to the inputted query based on the matching word groups.

34. The method of claim 33, wherein providing at least one response includes determining a total weight value for each response based on weight values of each of the matching word groups.

35. The method of claim 34, wherein the weight values for the word groups whose pronouns were replaced is equal to or less then the weight values for the word groups that did not include pronouns.

* * * * *